United States Patent [19]

Tatsumi et al.

[11] Patent Number: 4,726,186
[45] Date of Patent: Feb. 23, 1988

[54] CONTROL SYSTEM OF HYDRAULIC CONSTRUCTION MACHINERY

[75] Inventors: Akira Tatsumi, Tokyo; Nobuya Okabe, Tsuchiura; Mitsuo Kihara; Seiji Tamura, both of Ibaraki, all of Japan

[73] Assignee: Hitachi, Construction Machinery Co., Japan

[21] Appl. No.: 947,524

[22] Filed: Dec. 29, 1986

[30] Foreign Application Priority Data

| Dec. 28, 1985 | [JP] | Japan | 60-298516 |
| Dec. 28, 1985 | [JP] | Japan | 60-298517 |
| Dec. 28, 1985 | [JP] | Japan | 60-298518 |
| Mar. 22, 1986 | [JP] | Japan | 61-64577 |
| Mar. 22, 1986 | [JP] | Japan | 61-64578 |

[51] Int. Cl.⁴ .............................................. F16D 31/02
[52] U.S. Cl. ....................................................... 60/434
[58] Field of Search .......................... 60/434, 433, 431; 417/316

[56] References Cited

U.S. PATENT DOCUMENTS

| 3,369,360 | 2/1968 | DeBiasi | 60/433 X |
| 3,579,978 | 5/1971 | Stams | 60/433 X |
| 3,724,205 | 4/1973 | Hallberg | 60/433 X |

FOREIGN PATENT DOCUMENTS

| 122807 | 10/1984 | European Pat. Off. |
| 58-232160 | 12/1983 | Japan |
| 59-206363 | 10/1984 | Japan |
| 977601 | 12/1964 | United Kingdom |
| 1044851 | 10/1966 | United Kingdom |

Primary Examiner—Edward K. Look
Attorney, Agent, or Firm—Antonelli, Terry & Wands

[57] ABSTRACT

A control system of hydraulic construction machinery includes a prime mover, at least one variable displacement pump driven by the prime mover, at least one actuator hydraulically driven by the pump, maximum revolution number altering device for the prime mover, maximum displacment volume altering device for the pump and an information provider device for providing information on the operation mode of the actuator, whereby the maximum revolution number altering means and maximum displacement volume altering means are controlled by the information provider device to provide a maximum number of revolutions and a maximum displacement volume which suit the operation mode indicated by the output signal. A product of the maximum displacement volume and the number of revolutions becomes at a constant always at the same time when the maximum displacement volume of the pump is varied in response to an output signal of the information provider device, whereby a change in the quantity of pumped fluid can be avoided when the maximum displacement volume of the pump is altered.

17 Claims, 31 Drawing Figures

CONTROL SYSTEM OF HYDRAULIC CONSTRUCTION MACHINERY

BACKGROUND OF THE INVENTION

This invention relates to control systems of hydraulic construction machinery, and more particularly it is concerned with a control system of hydraulic construction machinery provided with at least one variable-displacement hydraulic pump driven by a prime mover for driving desired working elements through actuators for operation.

One typical example of the hydraulic construction machinery is a wheel type hydraulic excavator which generally comprises a prime mover or an engine, means for controlling the number of revolutions of the engine such as a fuel injection device including an engine lever operated by an operator in his cab and a governor lever connected to the engine lever, at least one variable-displacement hydraulic pump driven by the engine, means for controlling the displacement volume of the hydraulic pump, a plurality of actuators driven by pressurized fluid discharged by the hydraulic pump and a plurality of working elements driven by the respective actuators. The working elements generally comprise left and right travel devices and other working elements including a swing and front attachments, such as a boom, an arm and a bucket.

In this type of hydraulic excavator, operation levers are provided one for each working element and operated by the operator to actuate a directional control valve located between the hydraulic pump and the corresponding actuator, so that the pressurized fluid discharged by the hydraulic pump driven by the engine can be fed to the corresponding actuator to drive the same to operate the working element. Thus, the pressurized fluid supplied to the actuators moves either one or both of the travel devices, causes the swing to move in swinging movement and renders the front attachments operative to perform excavation.

In a conventional hydraulic excavator in general, the maximum value of the number of revolutions of the engine controlled by a fuel injection device is constant, and the maximum value of the displacement volume of the hydraulic pump controlled by the regulator or the maximum value of the tilting angle of a swash plate when the hydraulic pump is of a swash plate type is also constant. The maximum constant number of revolutions and the maximum constant displacement volume are uniquely set such that when the pump is in a condition for the maximum displacement volume, the hydraulic pump provides a desired maximum delivery at the maximum number of revolutions and at the same time a desired pump consumption horsepower can be obtained at the maximum number of revolutions. In other words, in this type of hydraulic excavator, the maximum delivery of the pump and the engine horsepower characteristics are uniquely decided by the product of the maximum number of revolutions and the maximum displacement volume and by the set maximum number of revolutions, respectively.

Meanwhile the working elements of a hydraulic excavator each do work of a content which differs from one working element to another, such as traveling, swinging, excavation, etc. Although each working element does work of the predetermined content, loads applied to working elements differ from each other depending on the amount of work. For example, in the case of travel devices, a load applied to them is low when the road surface is flat and it is high when the travel is uphill. In each front attachment, for example, there are heavy-excavation requiring a great amount of work and light-excavation involving a relatively small amount of work.

Thus, in the conventional hydraulic excavator, a problem arises when it is necessary to do work in which the load varies greatly, because of the fact that the maximum number of revolutions of the engine and the maximum displacement volume of the hydraulic pump are set at a constant in value as described hereinabove.

For example, wheel type hydraulic excavators are allowed to travel on roads in addition to moving around at the site of the work, and their maximum speeds are set at relatively high levels in many cases. In Japan, for example, their maximum speed of travel is set at 35 km/h. This makes it necessary for a wheel type hydraulic excavator to be able to travel at the maximum speed of 35 km/h. Roads include flat ones and slopes. Thus it is desirable that the hydraulic excavator be able to travel at the legally set maximum speed of 35 km/h regardless of the type of road on which it travels.

Because of this, a wheel type hydraulic excavator is faced with specific problems that should be obviated, because it has a higher speed of travel than a crawler type hydraulic excavator and it preferably is able to travel at the legally set maximum speed of 35 km/h even when it travels uphill under a high load.

To be more specific, if the maximum number of revolutions of the engine and the maximum displacement volume of the hydraulic pump are set such that, by placing emphasis on the ability to travel uphill under a high load, the engine has a horsepower characteristic which will enable a high pump consumption horsepower to be obtained and will provide a high delivery by the pump, the hydraulic excavator will suffer the disadvantages of being high in fuel consumption and noise level when it does a type of work, such as travelling on a flat load or doing excavation under a low load, which requires a lower pump consumption horsepower than the uphill travel. Conversely, if the above values are set by placing emphasis on the ability to travel on flat roads or perform excavation, it will be impossible to obtain a high pump consumption horsepower, so that no sufficiently high horsepower can be obtained when travelling uphill and it will be impossible to travel at the legally set maximum speed of 35 km/h. Considering the excavation work done by a front attachment; if, by placing emphasis on performing heavy-excavation, the maximum number of revolutions of the engine and the maximum displacement volume of the hydraulic pump are set such that the engine has a horsepower characteristic enabling a high pump consumption horsepower and a maximum delivery by the hydraulic pump becomes a suitable value, it will be possible to perform heavy-excavation at a desired speed but part of the engine horsepower will be wasted when light-excavation is performed at the set values. Thus the hydraulic excavator will suffer the disadvantages that its fuel consumption is high and the engine produces unnecessary high noises. Conversely, if the maximum values are set by placing emphasis on doing light-excavation, it will be impossible to perform heavy-excavation satisfactorily. This problem is shared by a wheel type hydraulic excavator and a crawler type hydraulic excavator.

To sum up, if the maximum number of revolutions of the engine and the maximum displacement volume of the hydraulic pump are set in construction machinery, such as a hydraulic excavator, by placing emphasis on its ability to perform operations under a high load, then the problem that its fuel consumption, noise level and costs are high will arise when it operates under a low load. If the maximum values are set by placing emphasis on its ability to do work under a low load, it will be impossible to achieve a high performance in performing operations under a high load.

JP-A-No. 58-135341 (Japanese patent application No. 16349/82) laid open to public inspection on Aug. 11, 1983 in Japan discloses a control system of hydraulic construction machinery which is provided with means for sensing the operating conditions of the actuators and which is operative to increase the number of revolutions of the engine and decrease the displacement volume of the hydraulic pump when it is sensed that an actuator tending to have a high load applied thereto is in operation and which is operative to decrease the number of revolutions of the engine and increase the displacement volume of the hydraulic pump when it is sensed that an actuator tending to have a low load applied thereto is in operation, to thereby avoid a sudden change in the delivery by the pump with respect to a fluctuation in load to save energy and improve the operability of the machinery.

As described hereinabove, loads applied to a working element may vary one from another depending on the amount of work. The control system referred to hereinabove can not cope with such variation in load. That is, the problem encountered when the hydraulic excavator travels on flat roads with the maximum values having been set by placing emphasis on the ability to travel uphill at high speed and the problem raised when light-excavation is performed with the maximum values having been set by placing emphasis on the ability to perform heavy-excavation, as described hereinabove, have not been dissolved by the control system referred to hereinabove. In other words, the control system referred to hereinabove is unable to obviate the fundamental disadvantage of conventional hydraulic excavators when work done by a working element shows a wide range of variations in amount.

The inventors of the subject application have proposed to use a control system of hydraulic construction machinery which aims at dissolving the aforesaid problems as disclosed in Japanese patent application No. 239897/85 of which corresponding applications are U.S. Ser. No. 904118, Korea Appln. No. 7274/86, India Appln. No. 670/Cal/86, China Appln. No. 86106816 and EPC Appln. No. 86112330.5.

The control system comprises a prime mover, revolution number control means for controlling the number of revolutions of the prime mover, at least one variable-displacement hydraulic pump, driven by the prime mover displacement volume control means for controlling the displacement volume of the hydraulic pump, at least one actuator driven by pressurized fluid delivered by the hydraulic pump, maximum revolution number altering means associated with the revolution number control means for altering the maximum number of revolutions of the prime mover between at least a first maximum value and a second maximum value greater than the first maximum value, maximum displacement volume altering means associated with the displacement volume control means for altering the maximum displacement volume of the hydraulic pump between at least a first maximum value and a second maximum value greater the first maximum value and information provider means for providing information on the operation mode of the actuator, whereby the maximum revolution number altering means and maximum displacement volume altering means are controlled by an output signal of the information provider means to provide a maximum number of revolutions and a maximum displacement volume which suit the operation mode indicated by the output signal. More specifically, maximum revolution number limiter means limiting the maximum number of revolutions to either the first maximum value or the second maximum value serves as the maximum revolution number altering means, and a mode selection switch capable of selecting either a power mode or an economy mode serves as the information provider means. The maximum revolution number altering means and maximum displacement volume altering means are controlled in such a manner that, when the power mode is selected by the mode selection switch, a combination of the second maximum value of the number of revolutions and the first maximum value of displacement volume suiting a high load operation is selected, and, when the economy mode is selected, a combination of the first maximum value of the number of revolutions and the second maximum value of displacement volume suiting a low load operation is selected. This enables a satisfactory performance to be obtained in both the high-load and low-load operations, and makes it possible to dissolve the problems encountered with regard to a high noise level and a high fuel consumption in the low load operation. The maximum values are set such that the product of the first maximum value of the number of revolutions and the second maximum value of displacement volume is essentially equal to the product of the second maximum value of the number of revolutions and the first maximum value of displacement volume. Thus, even if the aforesaid combinations are changed when the number of revolutions of the prime mover the has either the first maximum value or the second maximum value declared by the maximum revolution number limiter means, the delivery by the hydraulic pump shows substantially no change.

The invention disclosed in Japanese patent application No. 239897/85 which uses the maximum revolution number altering means of a type which limits the maximum number of revolutions of the prime mover has raised the problem that a variation occurs in the delivery by the hydraulic pump if the mode selection switch is actuated to give a command to change the operation modes when no limit is placed on the maximum value of revolutions of the prime mover. That is, if the mode selection switch is actuated to alter the mode to the economy mode when the power mode has been selected by the mode election switch and the actual number of revolutions of the prime mover lies between the first maximum value and the second maximum value, the maximum displacement volume will be altered to the second maximum value and the maximum number of revolutions will be limited to the first maximum value. As described hereinabove, the product of the first maximum value of the number of revolutions and the second maximum value of displacement volume is set to be substantially equal to the product of the second maximum value of the number of revolutions and the first maximum value of displacement volume, but does not become equal to the product of a number of revolutions smaller than the second maximum value of the number of revolutions and the first maximum value of displacement volume. Thus a variation will be caused to occur in the quantity of pressurized fluid delivered by the hydraulic pump. Also, if the mode selection switch is actuated to give a command to change the operation modes when the number of revolutions of the prime mover is smaller than the first maximum value, only the maximum displacement volume will be altered and the number of revolutions of the prime mover will not be altered, no matter which mode is to be selected. This will also cause a change to occur in the quantity of pressurized fluid delivered by the hydraulic pump.

SUMMARY OF THE INVENTION

Accordingly this invention has as its object the provision of a control system of hydraulic construction machinery which is capable of freely changing the operation modes without suffering the disadvantages of producing noises and increasing fuel consumption and which is substantially free from a variation in the quantity of pressurized fluid delivered by the hydraulic pump when the operation modes are changed.

To accomplish the aforesaid object, the invention provides a control system of hydraulic construction machinery comprising a prime mover, revolution number control means for controlling the number of revolutions of the prime mover, at least one variable-displacement hydraulic pump driven by the prime mover, displacement volume control means for controlling the displacement volume of the hydraulic pump, at least one actuator driven by pressurized fluid delivered by the hydraulic pump, maximum revolution number altering means associated with the revolution number control means for altering the maximum number of revolutions of the prime mover between at least a first maximum value and a second maximum value greater than the first maximum value, maximum displacement volume altering means associated with the displacement volume control means for altering the maximum displacement volume of the hydraulic pump between at least a first maximum value and a second maximum value greater than the first maximum value and information provider means for providing information on the operation mode of the actuator, so that the maximum revolution number altering means and maximum displacement volume altering means are controlled by an output signal of the information provider means to provide a maximum number of revolutions and a maximum displacement volume which suit the operation mode indicated by the output signal, wherein the improvement comprises control means for controlling the maximum revolution number altering means and said maximum displacement volume altering means such that a product of the maximum displacement volume and number of revolutions becomes at a constant always at the same time when the maximum displacement volume of said hydraulic pump is varied in response to an output signal of the information provider means whereby a change in the quantity of pressurized fluid delivered by the hydraulic pump can be essentially avoided when the maximum displacement volume of the hydraulic pump is altered.

Preferably, the control means of the control system of construction machinery comprises revolution number sensor means for sensing the number of revolutions of the prime mover, and wherein the maximum revolution number altering means is structed to alters the number of revolutions of the prime mover when the number of revolutions of the prime mover controlled by the revolution number control means exceeds the first maximum value and wherein the control means controls the maximum revolution number altering means and maximum displacement volume altering means in response to the output signal of the revolution number sensor means in such a manner that, when the number of revolutions of the prime mover has a value equal to or smaller than the first maximum value, the maximum displacement volume of the hydraulic pump has the second maximum value, and that, when the number of revolutions of the prime mover exceeds the first maximum value, the maximum displacement volume of the hydraulic pump is reduced and at the same time the maximum number of revolutions of the prime mover is increased.

Preferably, the maximum revolution number altering means of the control system of hydraulic construction machinery comprises revolution number altering means for altering by a predetermined amount of the number of revolutions of the prime mover, regardless of the value of the number of revolutions, controlled by the revolution number control means to provide a large number of revolutions and a small number of revolutions, and wherein the control means controls the revolution number altering means and maximum displacement volume altering means in response to operation mode information provided by the information provider means in such a manner that, when the information indicates a low-load operation, the hydraulic pump and prime mover are controlled by a first combination in which the maximum displacement volume of the hydraulic pump has the second maximum value and the number of revolutions of the prime mover is the small number of revolutions, and, when the information indicates a high-load operation, the hydraulic pump and prime mover are controlled by a second combination in which the maximum displacement volume of the hydraulic pump has the first maximum value and the number of revolutions of the prime mover is the large number of revolutions.

DESCRIPTION OF THE PREFERRED EMBODIMENTS

Figure 1:
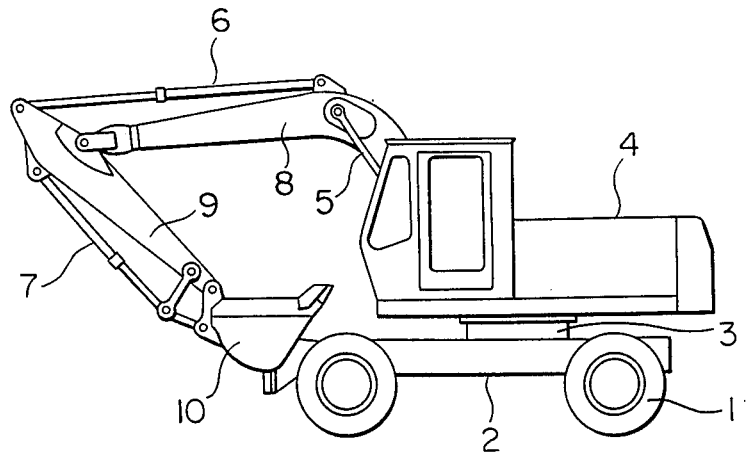
FIG. 1 is a view, as seen from outside, of a wheel type hydraulic excavator, which is typical of hydraulic construction machinery, in which the control system according to the invention can be incorporated.

Preferred embodiments of the invention will now be described by referring to the accompanying drawings. Before describing the embodiments, a wheel type hydraulic excavator having incorporated therein a preferred embodiment of the invention will be outlined by referring to FIG. 1. The hydraulic excavator comprises a lower travel body 2 equipped with travelling wheels 1, and an upper swing body 4 located above the lower travel body 2 and connected thereto through an annular swing 3. The upper swing body 4 supports thereon front attachments including a boom 8, an arm 9 and a bucket 10 driven by hydraulic cylinders 5, 6 and 7, respectively. The travelling wheels 1 are driven by a hydraulic motor 11 (see FIG. 2), and the annular swing 3 id driven by a hydraulic motor, not shown. The hydraulic cylinders 5, 6 and 7 and the hydraulic motors shall be hereinafter generally referred to as actuators.

First embodiment

Figure 2:
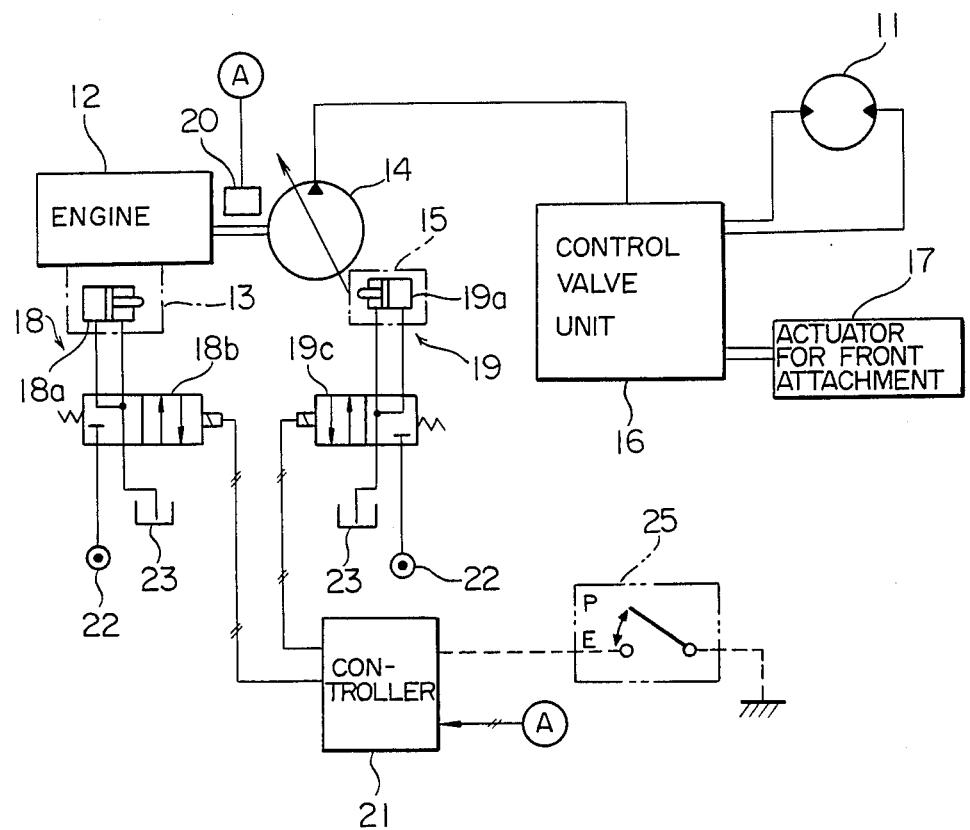
FIG. 2 is a circuit diagram of a control system of a first embodiment of the invention.

A first embodiment of the control system in conformity with the invention incorporated in the hydraulic excavator shown in FIG. 1 is shown in FIG. 2 and comprises a prime mover or an engine 12, revolution number control means 13 for controlling the number of revolutions of the engine 12, a variable-displacement hydraulic pump 14 driven by the engine 12 and displacement volume control means or a pump regulator 15 for controlling the displacement volume of the hydraulic pump 14. The travel hydraulic motor 11 and an actuator unit 17 of the front attachments are connected through a control valve unit 16 to an outlet port of the hydraulic pump 14 so that they are driven by pressurized fluid delivered by the hydraulic pump 14. The hydraulic pump 14 is of a swash plate type, so that controlling the displacement volume is the same as controlling the tilting angle of the swash plate. Control valves of the control valve unit 16 are operated by operation levers, not shown, which are provided with respective control valves, and the actuator unit 17 includes the hydraulic motor for driving the annular swing 3 besides the hydraulic cylinders 5, 6 and 7 for the front attachments.

Associated with the revolution number control means 13, maximum revolution number altering means 18 is provided which alters the maximum number of revolutions of the engine 12 between a first maximum value $N_E$ and a second maximum value $N_P$ which is greater than the first maximum value $N_E$. Associated with the pump regulator 15, maximum displacement volume altering means 19 is provided which alters the maximum displacement volume of the hydraulic pump 14 between a first maximum value $q_P$ and a second maximum value $q_E$ which is greater than the first maximum value $q_P$. The maximum revolution number altering means 18 and maximum displacement volume altering means 19 are set such that the maximum values $N_E$, $N_P$, $q_P$ and $q_E$ satisfy a equation $N_E \times q_E \approx N_P \times q_P$.

Figure 3A:
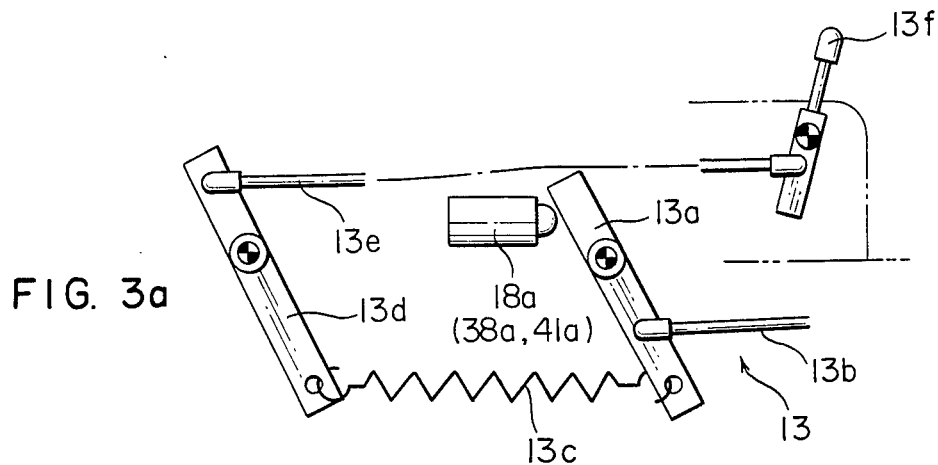
FIGS. 3a, 3b and 3c are schematic views showing the construction and operation of the revolution number control means and maximum revolution number altering means of the embodiment shown in FIG. 2.
Figure 3B:
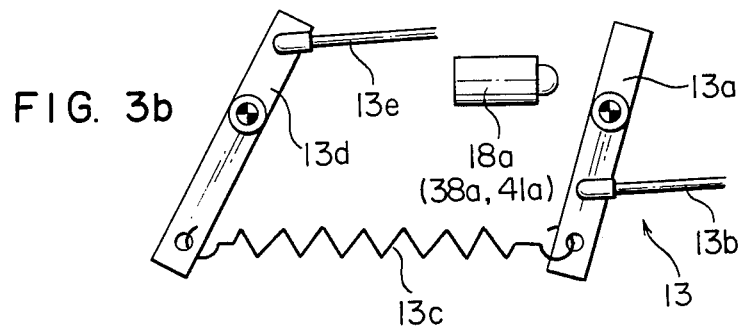
Figure 3C:
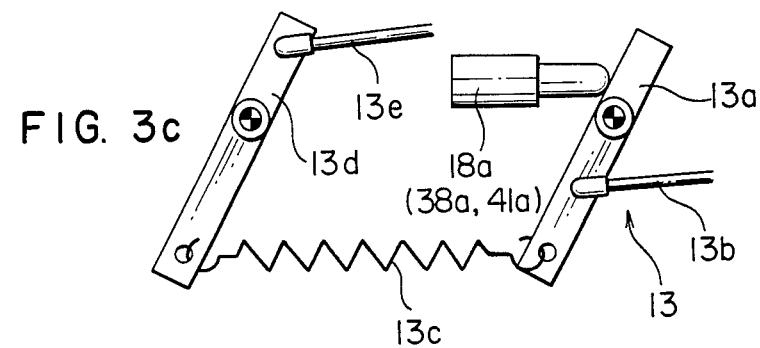

Referring to FIGS. 3a, 3b and 3c, the revolution number control means 13 comprises a lever 13a pivotally supported at a predetermined location, and a throttle lever 13b connected at one end to a governor, not shown, and at an opposite end to the lever 13a substantially at its midpoint. A spring 13c is connected at one end to a forward end of the lever 13a and at an opposite end to one end of a lever 13d pivotally supported at a predetermined location. The lever 13d is connected at an opposite end to an engine control lever 13f in the cab through a push-pull cable 13e. By manipulating the engine control lever 13f, it is possible to continuously control the number of revolutions of the engine 12 from idling to the first maximum value $N_E$ in a range of revolutions below $N_E$.

The first maximum value $N_E$ of the engine 12 is set such that, when the tilting angle of the swash plate of the pump 14 or the displacement volume thereof is $q_E$, the engine 12 is capable of developing 35 km/h on flat roads or of performing excavation at a predetermined speed, with a minimum necessary horsepower. That is, $N_E$ and $q_E$ represent a maximum number of revolutions and a maximum displacement volume, respectively, which are suitable for a low-load operation of the hydraulic excavator.

The maximum revolution number altering means 18 comprises an actuator 18a for controlling the angle of the pivotal movement of the lever 13a, which controls the lever 13a to pivotally move through a maximum angle as shown in FIG. 3c in a range in which the number of revolutions of the engine 12 exceeds $N_E$ so that the engine 12 rotates at the second maximum value $N_P$ of the number of revolutions.

The second maximum value $N_P$ of the engine 12 is set at a level such that, when the displacement volume of the pump 14 is $q_p$, the engine 12 can develop 35 km/h to travel uphill along a slope of a predetermined value with a minimum necessary horsepower. That is, $N_P$ and $q_P$ represent a maximum number of revolutions and a maximum displacement volume, respectively, which are suitable for a high-load operation of the hydraulic excavator.

FIG. 3a shows the engine 12 in idling condition. FIG. 3b shows the engine control lever 13f being actuated to control the number of revolutions of the engine 12 to the first maximum value $N_E$. FIG. 3c shows the engine 12 at full throttle.

In the embodiment shown and described hereinabove, when the engine control lever 13f is pulled to the maximum, the maximum number of revolutions of the engine 12 exceeds the first maximum value $N_E$ and attains a level $N_E'$. Even if the actuator 18a is rendered operative, the engine control lever 13f remains stationary.

Referring to FIG. 2 again, the actuator 18a is connected to a pressure source 22 and a reservoir 23 via an electromagnetic valve 18b.

Figure 4:
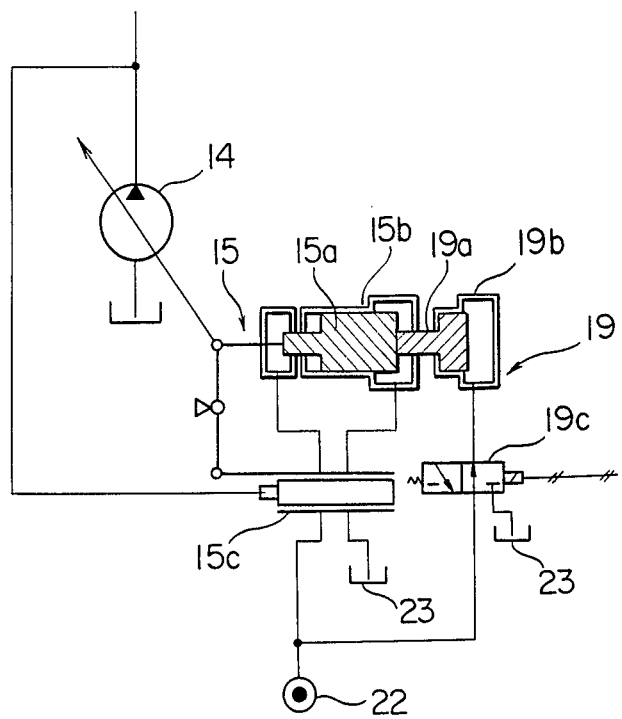
FIG. 4 is a schematic view of the displacement volume control means and maximum displacement volume altering means of the embodiment shown in FIG. 2, showing their construction and operation.

Referring to FIG. 4, the pump regulator 15 comprises an actuator 15b having a piston 15a connected to the swash plate of the hydraulic pump 14 via a linkage, and a servo-valve 15c connected to the linkage for selectively bringing the actuator 15b into communication with one of the pressure source 22 and reservoir 23. The maximum displacement volume altering means 16 comprises an actuator 19b having a piston 19a capable of positioning itself against the piston 15a of the actuator 15b of the pump regulator 15, and an electromagnetic valve 19c for selectively bringing the actuator 19b into communication with one of the pressure source 22 and reservoir 23.

Figure 5:
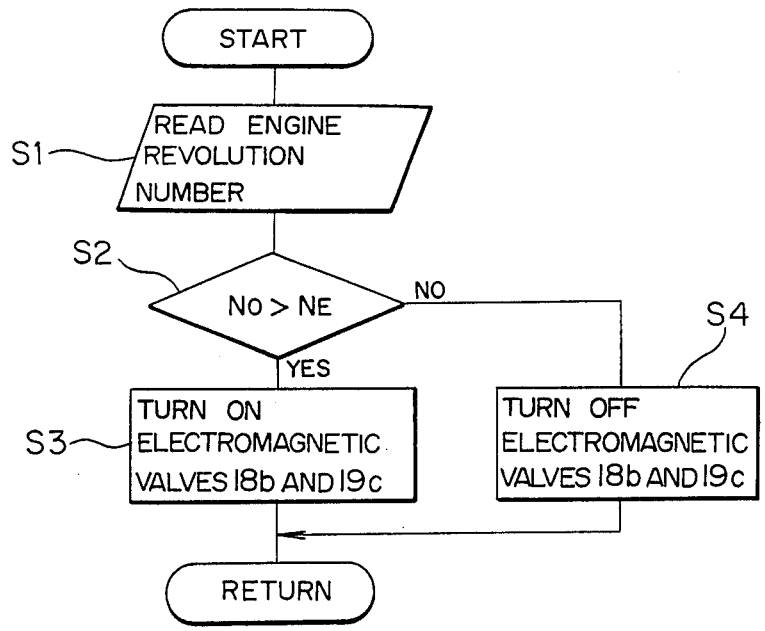
FIG. 5 is a flow chart showing the program of control steps followed by the controller of the embodiment shown in FIG. 2.

Referring to FIG. 2 again, the reference numeral 21 designates a controller which may be constituted by a microcomputer, for example. An engine revolution number sensor 20 which is mounted around an output shaft of the engine 12 to serve as means for providing information on the mode of operation of each actuator is connected to an inlet port of the controller 21. The electromagnetic valves 18b and 19c are connected to outlet ports of the controller 21 and controlled, according to the program shown in FIG. 5 presently to be described, in such a manner that they are turned off when the number of revolutions of the engine 12 is below the first maximum value $N_E$ and turned on when it exceeds the first maximum value $N_E$.

The program stored in a read-only memory (ROM) of the controller 21 will be described by referring to FIG. 5.

In step S1, the number of revolutions No of the engine is read into the controller 21 based on a signal from the engine revolution number sensor 20. In step S2, the number of revolutions of the engine No is compared with the first maximum value $N_E$ of the number of revolutions of the engine 12 stored beforehand in the ROM. When it is indicated that the signal from the sensor 20 representing the current number of revolutions No of the engine 12 exceeds the first maximum value $N_E$ suitable for an operation under a low load, the operation shifts from step S2 to step S3. When the signal is indicated to be below the first maximum value $N_E$, the operation shifts from step S2 to step S4. In step S3, the electromagnetic valves 18b and 19c are both turned on; in step S4, they are both turned off.

The maximum revolution number altering means 18 operates such that, when the number of revolutions of the engine 12 controlled by the revolution number control means 13 exceeds the first maximum value $N_E$, it further alters the number of revolutions of the engine 12. The controller 21 responds to an output signal of the revolution number sensor means 20 and controls the maximum revolution number altering means 18 and maximum displacement volume altering means 19 in such a manner that, when the number of revolutions of the engine 12 is equal to or smaller than the first maximum value $N_E$, the maximum displacement volume of the hydraulic pump 14 has the second maximum value $q_E$ and that, when the number of revolutions of the engine 12 exceeds the first maximum value $N_E$, the maximum displacement volume of the pump 14 is reduced and at the same time the maximum number of revolutions of the engine 12 is increased. Particularly in this embodiment, the controller 21 is constructed to alter the displacement volume of the hydraulic pump 14 discontinuously to the first maximum value $q_P$ by the maximum displacement volume altering means 19 when the number of revolutions of the prime mover 12 exceeds the first maximum value $N_E$ and at the same time to alter the maximum number of revolutions of the prime mover 12 to the second maximum number $N_P$ by the maximum revolution number altering means 18.

Operation of the first embodiment of the aforesaid construction will be described.

Figure 6:
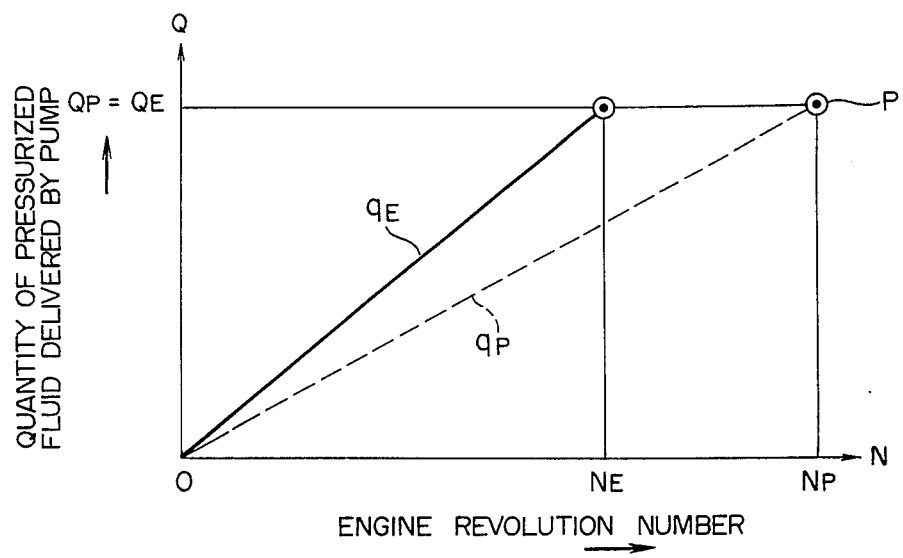
FIG. 6 is a diagrammatic representation of the relation between the number of revolutions N of the engine and the quantity of pressurized fluid Q delivered by the pump in the embodiment shown in FIG. 2.
Figure 9:
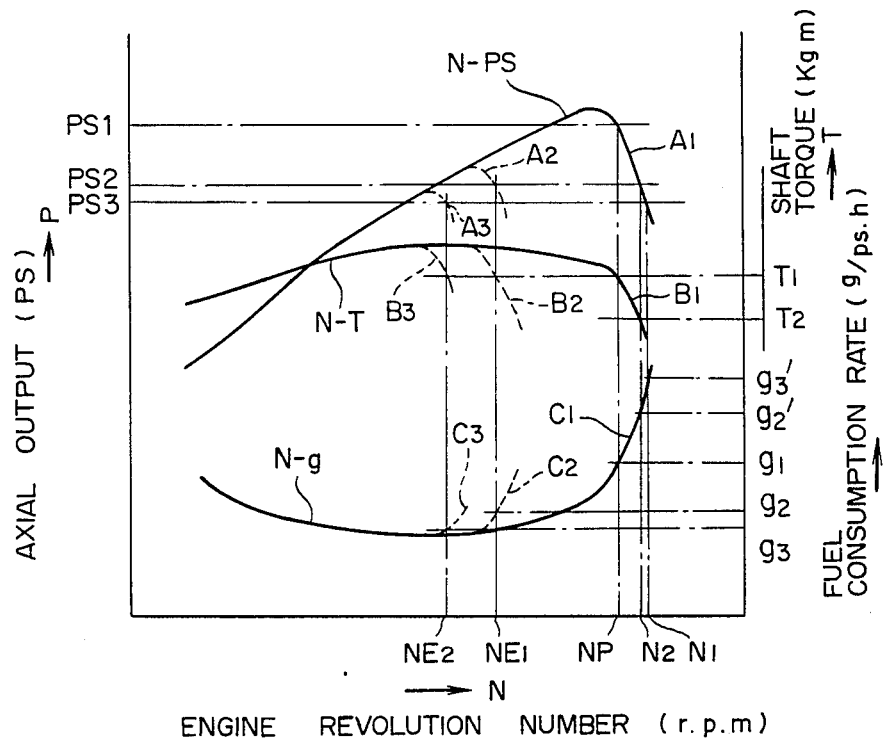
FIG. 9 is a diagram showing the performance of the engine of the embodiment shown in FIG. 2.

(1) When the Number of Revolutions of the Engine is below the First Maximum Value $N_E$ suitable for Operations under Low Load When the number of revolutions of the engine 12 is below the first maximum value $N_E$ suitable for the low-load operation, the electromagnetic valves 18b and 19c are both turned off, so that the actuator 19a for controlling the maximum tilting angle of the swash plate of the pump 14 and the actuator 18a for controlling the number of revolutions of the engine 12 are both inoperative. Consequently, the maximum displacement volume of the pump 14 is set at the second maximum value $q_E$ suitable for the low-load operation and the number of revolutions of the engine 12 has a value commensurate with the amount of operation of the engine control lever 13f in the cab. In this case, the N-Q line is as indicated by a solid line in FIG. 6, and when the number of revolutions of the engine 12 is $N_E$, the P-Q line is as indicated by a one-dot chain line E in FIG. 7. FIG. 9 shows an example of the P-Q line of a conventional hydraulic pump which is not controlled to change the maximum tilting angle of its swash plate as is done in the pump according to the invention. In the example shown, if the number of revolutions of the engine is made to fall from $N_o$ to $N_o'$, then the quantity of pressurized fluid delivered by the pump falls from $Q_o$ to $Q_o'$, thereby making it impossible to reduce fuel consumption while keeping the operation speed unaltered.

(2) When the Number of Revolutions of the Engine Exceeds the First Maximum Value $N_E$ suitable for the Low-Load Operation If the engine control lever 13f is pulled to the maximum and the number of revolutions of the engine 12 exceeds the first maximum value $N_E$ and becomes $N_E'$, the electromagnetic valves 18b and 19c are both turned on and the actuators 18a and 19a are both rendered operative. Thus, the maximum displacement volume of the pump 14 is set at the first maximum value $q_P(<q_E)$ suitable for the high-load operation, and at the same time, the number of revolutions of the engine 12 is controlled, as shown in FIG. 3c, to the second maximum value $N_P$ suitable for the high-load operation which is the maximum number of revolutions of the engine 12 mounted in the system. In this case, the condition in the N-Q curve is indicated at a point P shown in FIG. 6, and the P-Q curve is as indicated by a solid line P in FIG. 7.

The maximum displacement volumes $q_P$ and $q_E$ and the maximum numbers of revolutions of the engine $N_E$ and $N_P$ are set such that the following relation holds, as described hereinabove:

$$q_E \times N_E = q_P \times N_P$$

where $q_E > q_P$ and $N_E < N_P$. Thus, when the maximum number of revolutions of the engine 12 and the maximum displacement volume of the pump 14 are switched, the quantity of pressurized fluid delivered by the pump 14 is kept substantially constant.

The embodiment shown and described hereinabove operates as follows. Assume that a wheel type hydraulic excavator incorporating the invention therein starts travelling on an uphill road, and the throttle lever is operated to raise the number of revolutions of the engine 12. If the number of revolutions of the engine 12 exceeds the first maximum value $N_E$, then the actuator 18a raises the maximum number of revolutions to the second maximum value $N_P$. At the same time, the maximum tilting angle of the swash plate of the pump 14 is reduced from the second maximum value $q_E$, which is used when the number of revolutions of the engine 12 is below the first maximum value $N_E$, to the first maximum value $q_P$. As a result, the engine output horsepower and the pump consumption horsepower are maximized, thereby enabling the wheel type hydraulic excavator to travel uphill at a desired speed or at 35 km/h, for example. Conversely, when the number of revolutions of the engine 12 is below the first maximum value $N_E$, the maximum displacement volume is set at the second maximum value $q_E$. As a result, the pump consumption horsepower suitable for the low-load operation, such as travelling on a flat road or performing light-excavation, can be obtained, enabling the engine to operate in a range of operations in which fuel consumption can be reduced. The low-load operation can be performed with a number of revolutions of the engine 12 below the first maximum value $N_E$, and this naturally is conducive to a reduction in noise level.

This feature will be further explained by referring to FIG. 9 showing the characteristics of the engine. In the diagram shown in this figure, curves $A_1$, $A_2$ and $A_3$ represent an engine revolution number-engine horsepower characteristic corresponding to setting of a number of revolutions $N_P$ of the engine 12 suitable for travelling uphill which is a high-load operation, an engine revolution number-engine horsepower characteristic corresponding to setting of a number of revolutions $N_{E1}$ of the engine 12 suitable for travelling on a flat road which is one of low-load operations and an engine revolution number-engine horsepower characteristic corresponding to setting of a number of revolutions $N_{E2}$ of the engine 12 suitable for excavation work which is one of low-load operations, respectively. Curves $B_1$, $B_2$ and $B_3$ represent an engine revolution number-engine torque characteristics corresponding to the setting of the engine revolution numbers $N_{E1}$ and $N_{E2}$, respectively. Curves $C_1$, $C_2$ and $C_3$ represent fuel consumption rate characteristics corresponding to the setting of the engine revolutions numbers $N_P$, $N_{E1}$ and $N_{E2}$ respectively. Lines $P_{S1}$, $P_{S2}$ and $P_{S3}$ represent a required horsepower for travelling uphill which is a high-load operation, a required horsepower for travelling on a flat road which is one of low-load operations and a required horsepower for performing excavation work which is one of low-load operations, respectively.

As can be seen in the figure, when the first maximum value $N_E$ of the number of revolutions of the engine 12 is set at $N_{E1}$, the engine revolution number-engine horsepower characteristic is as represented by the curve $A_2$ and the fuel consumption rate is as indicated by the curve $C_2$. Thus the fuel consumption rate is represented by $g_2$ when travelling on a flat road with the required horsepower of $P_{S2}$. Meanwhile, if the same operation is performed while setting the maximum number of revolutions at $N_P$, then the numer of revolutions rises to $N_2$ and the fuel consumption rate becomes $g_2$. As a result, the fuel comsumption rate is improved from $g_2$ to $g_2'$ and the number of revolutions of the engine 12 is reduced from $N_2$ to $N_{E1}$, thereby reducing noises. When excavation is performed by settig the first maximum value $N_E$ of the engine 12 at $N_{E2}$, it is also possible to reduce the fuel consumption rate from $g_3$ to $g_3'$ and to lower the number of revolutions of the engine 12 from $N_3$ to $N_{E2}$, thereby reducing noises.

Figure 7:
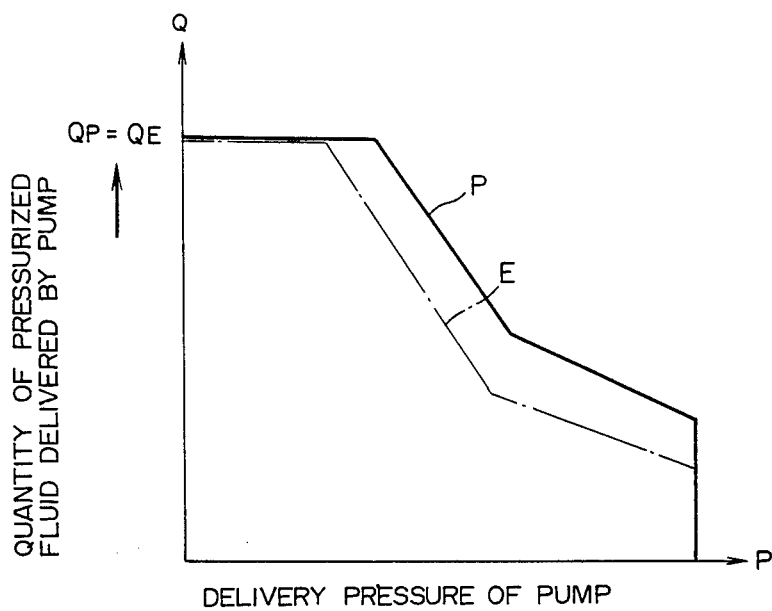
FIG. 7 is a view of the P-Q line of the hydraulic pump of the embodiment shown in FIG. 2.
Figure 8:
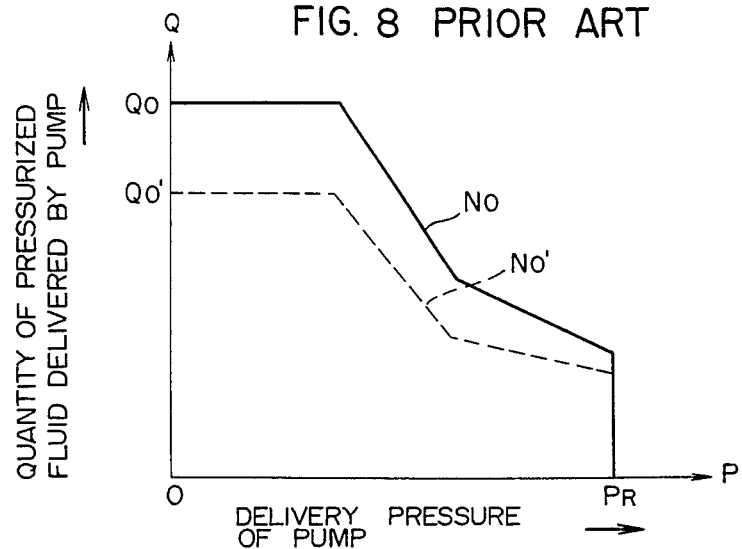
FIG. 8 is a view of the P-Q line of a hydraulic pump of a wheel type hydraulic excavator of the prior art.

As shown in FIG. 7, all the values are set such that the maximum quantity $Q_E$ of the pressurized fluid delivered by the pump 14 when the number of revolutions of the engine 12 is $N_E$ is substantially equal to the maximum quantity $Q_P$ of the pressurized fluid delivered by the pump 14 when the number of revolutions of the engine 12 is $N_P$. Thus, even if the maximum displacement volume changes from $q_E$ to $q_P$ during travelling, there is no change in the speed of travel of the excavator. This will give a good feel to the operator.

Operation modes are switched from one to another only when the number of revolutions of the engine 12 exceeds the first maximum value $N_E$ or becomes smaller than that. This eliminates the disadvantage that a change in the operation mode would cause a variation to occur in the quantity of pressurized fluid delivered by the hydraulic pump 14.

Second Embodiment

A second embodiment of the invention will be described by referring to FIGS. 2 and 10.

In the first embodiment, the engine 12 and pump 14 have been described as being controlled in such a manner that, when the number of revolutions of the engine 12 is determined, based on a signal from the revolution number sensor 20, to have exceeded the first maximum value $N_E$, the maximum displacement volume of the hydraulic pump 14 is altered from the second maximum value $q_E$ to the first maximum value $q_P$ and the maximum value of the engine 12 is altered from the first maximum value $N_E$ to the second maximum value $N_P$. In the second embodiment, a mode selection switch is further provided to effect the same control as described hereinabove based on two conditions including the number of revolutions of the engine 12 and the position of the mode selection switch.

More specifically, an economy mode for performing a low-load operation and a power mode for performing a high-load operation are set and selected by the mode selection switch 25 shown in a block in two-dots chain lines in FIG. 2. The mode selection switch 25 produces a power mode signal when moved to power mode selection position P and produces an economy mode signal when moved to an economy mode selection position E.

Figure 10:
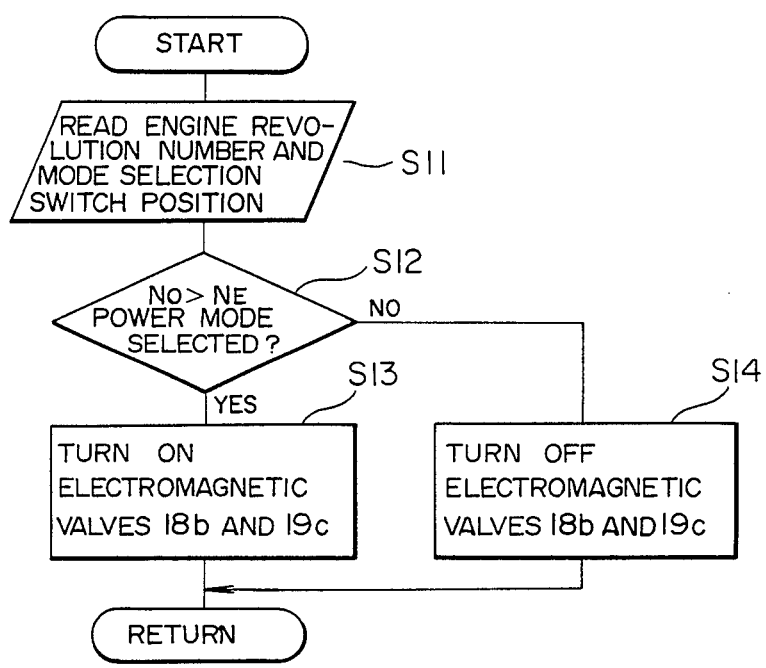
FIG. 10 is a flow chart showing a control program of the control system of second embodiment of the invention.

The hydraulic pump 14 and engine 12 are controlled in accordance with the process steps shown in FIG. 10 in place of those shown in FIG. 5. In step S12, it is determined whether the number of revolutions No is greater than the first maximum value $N_E$ and whether the power mode is selected, and in step 13, the power mode operation is performed in the power mode by altering the maximum displacement volume of the pump 14 from the second maximum value $q_E$ to the first maximum value $q_P$ and by altering the maximum value No of the number of revolutions of the engine 12 to the second maximum value $N_P$, only when the number of revolutions of the engine 12 has exceeded the first maximum value $N_E$ and the power mode has been selected. In other conditions than those described hereinabove, the maximum displacement volume of the hydraulic pump 14 is kept at the second maximum value $q_E$ and the number of revolutions of the engine 12 is controlled in accordance with the amount of operation of the engine control lever 13f.

In this construction, if the economy mode is selected, it is possible to avoid the risk that the operation might be performed inadvertently in the power mode, namely, with the number of revolutions $N_P$ of the engine 12 and the maximum displacement volume $q_P$ of the hydraulic pump 14.

In the foregoing description, uphill travelling has been described as being a high-load operation and flat road travelling or excavation has been described as being a low-load operation. However, the invention is not limited to this definition and the invention can have application in the control system in which heavy-excavation is performed as a high-load operation and light-excavation is performed as a low-load operation.

In the foregoing description, the invention has been described as being incorporated in a wheel type hydraulic excavator. However, the invention can also be incorporated in a crawler type hydraulic excavator. When incorporated in the latter type, the invention in particularly has utility in altering the operation modes between heavy-excavation and light-excavation operation modes.

In the foregoing description, determination of the number of revolutions of the engine 12 has been described as being done in accordance with the program in the controller 21. However, determination may be made by using a comparator, for example, without resorting to a program. Alternately, the number of revolutions of the engine 12 may be indirectly determined by using, as an engine revolution number sensor means a switch which is turned on when the engine control lever 13f in the cab or the throttle lever of the engine has moved to a position in which the number of revolutions of the engine 12 exceeds the first maximum value $N_E$, without using the revolution number sensor 20.

The number of revolutions of the engine 12 is increased by the hydraulic cylinder 18a. However, an actuator of the electromagnetic type may take the place of the hydraulic cylinder. Control of the maximum tilting angle of the swash plate of the hydraulic pump 14 may be effected by using an electromagnetic actuator also. When this is the case, the electromagnetic actuator may be directly driven by a signal produced by the revolution number sensor 20.

The construction and operation of each embodiment have been described in detail. Although not described, the change and modification explained in respect of the above embodiments may be applied to all other embodiments subsequently to be described.

Third to Sixth Embodiments

Other embodiments will now be described by referring to FIGS. 11–18. In the drawings, parts similar to those described by referring to the embodiments shown in FIGS. 1–10 and those which are commonly used in the embodiments shown in FIGS. 11–18 are designated by like reference characters.

The embodiments shown in FIGS. 11–16 differ from those referred to hereinabove in that they are constructed and relate to each other such that, when the number of revolutions of the engine 12 exceeds the first maximum value $N_E$, control means 39, 42, 47, maximum engine revolution number altering means 38, 41, 13 and maximum displacement volume altering means 37 continuously alter the maximum displacement volume of the hydraulic pump 14 until it reaches the first maximum value $q_P$, and at the same time continuously alter the maximum number of revolutions of the engine 12 until it reaches the second maximum value $N_p$.

Third Embodiment

A third embodiment will be described by referring to FIGS. 11–14. In the control system of this embodiment, the variable-displacement hydraulic pump 14 is connected to the travel motor 11 via a control valve 30, and a fixed displacement volume hydraulic pump 31 is connected to pilot ports 30a and 30b of the control valve 30 via a pilot valve 33 operated by a travel pedal 32 constituting travel control means and a change-over lever 35 operated by a forward/rearward movement lever 34. A throttle 36 is mounted between the fixed displacement volume hydraulic pump 31 and pilot valve 33, and fluids under different pressures at the front and rear of the throttle 36 are supplied to an actuator 37a of displacement volume altering means 37 (see FIG. 12) via an electromagnetic valve 37b. Meanwhile a pressure at an inlet port of the travel motor 11 at its forward movement side is supplied to an actuator 38a of engine resolution number altering means 38 via an electromagnetic valve 38b connected to a conduit 60 (see FIG. 11).

Figure 11:
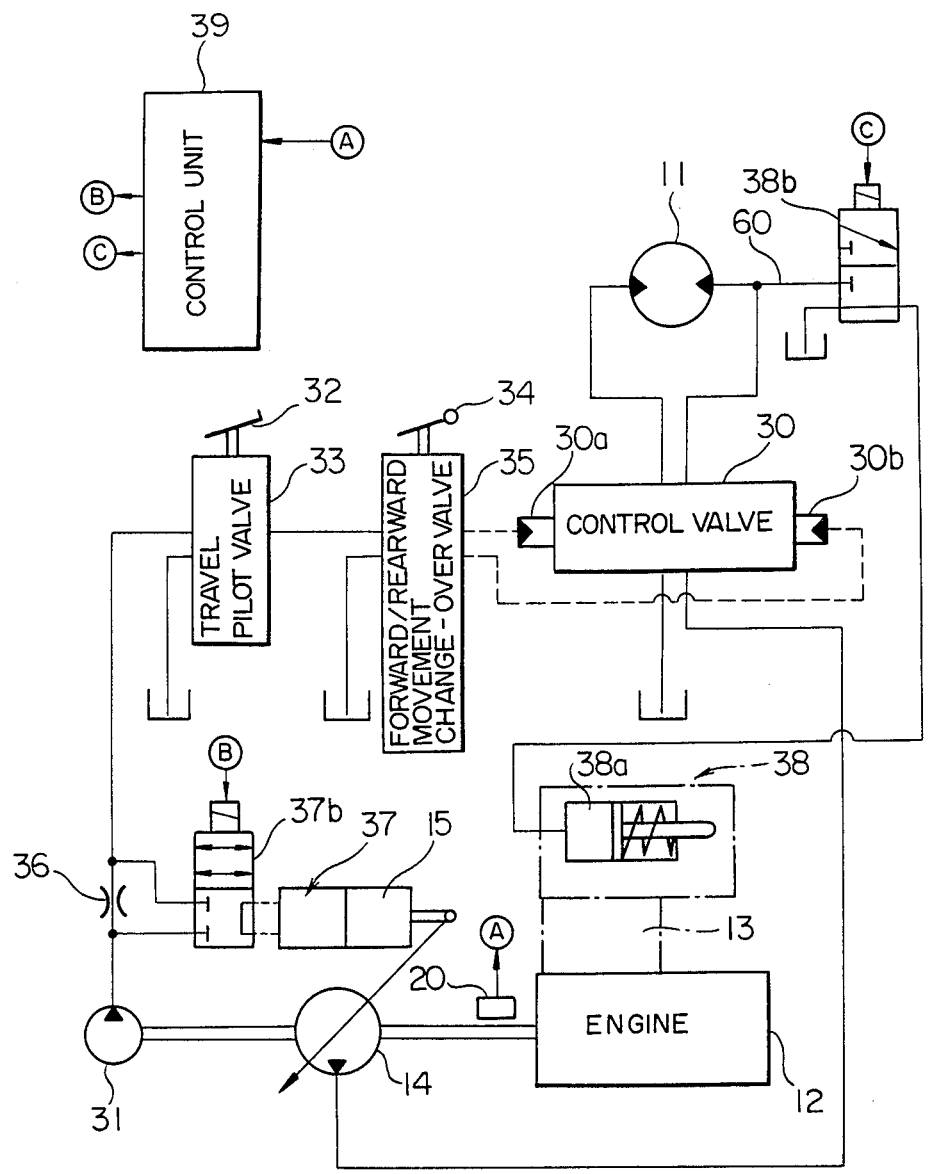
FIG. 11 is a circuit diagram of a control system of third embodiment of the invention.

The actuator 38a of the engine maximum revolution number altering means 38 is located in association with the engine revolution number control means 13 to control the angle of pivotal movement of the engine control lever 13f as shown in FIG. 3. As shown in FIG. 11, a spring 38c is mounted in the actuator 38a, so that, when the number of revolutions of the engine 12 exceeds the first maximum value $N_E$, the actuator 38a is operative to continuously increase the number of revolutions of the engine 12 in accordance with the pressure at the forward movement side of the travel motor 11.

Figure 12:
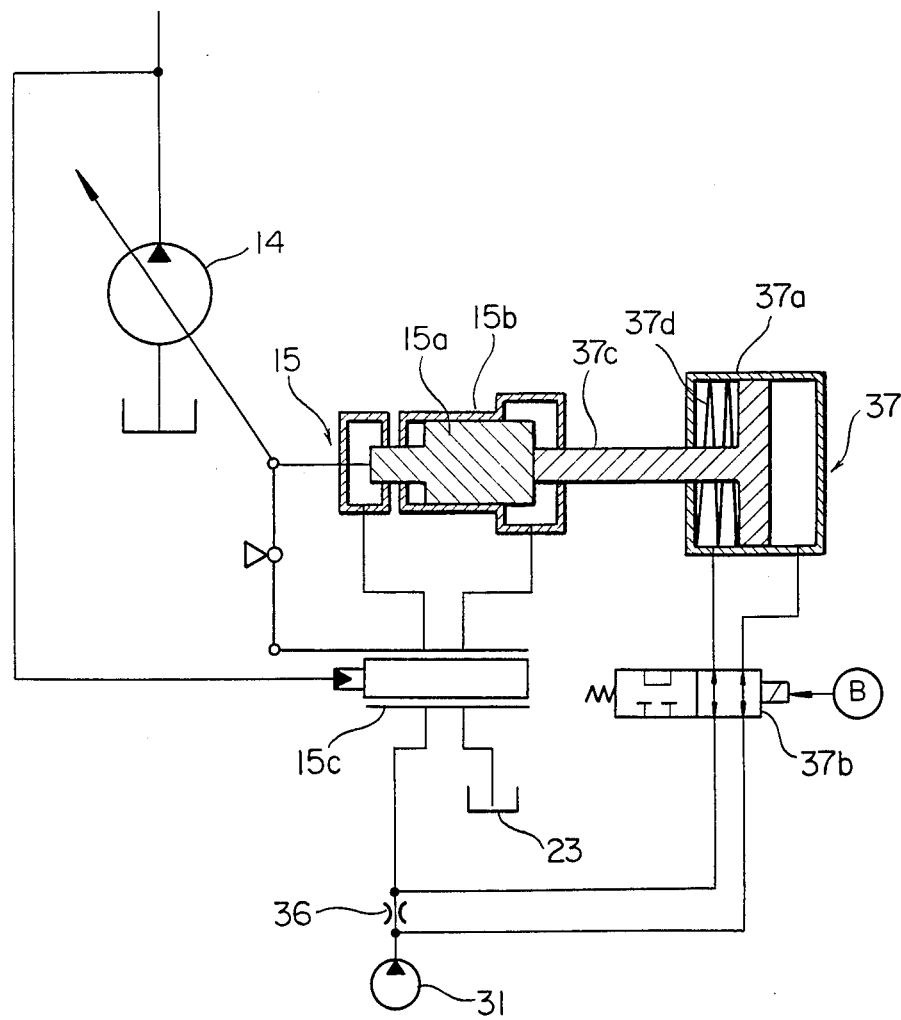
FIG. 12 is a schematic view of the displacement volume control means and maximum displacement volume altering means of the third embodiment shown in FIG. 11, showing their construction.

As shown in FIG. 12, the pump regulator 15 is of the same construction as the one of the first embodiment shown in FIG. 4. The maximum displacement volume control means 37 comprises an actuator 37a having a piston 37c adapted to be positioned against the piston 15a of the actuator 15b of the pump regulator 15, and having a spring 37d mounted therein. Pressurized fluids at the front and rear of the throttle 36, which differ from each other in pressure, are introduced into the actuator 37a via the electromagnetic valve 37b.

The revolution number sensor 20 constitutes revolution number sensor means and is connected to an inlet port of a control unit 29, and it is determined, in accordance with a program presently to be described, whether the number of revolutions of the engine 12 is larger or smaller than the first maximum value. Electromagnetic valves 37b and 38b are connected to outlet ports of the control unit 39 and turned on when the number of revolutions of the engine 12 exceeds the first maximum value $N_E$, to supply pressurized fluid to the actuators 37a and 38a, respectively.

Figure 13:
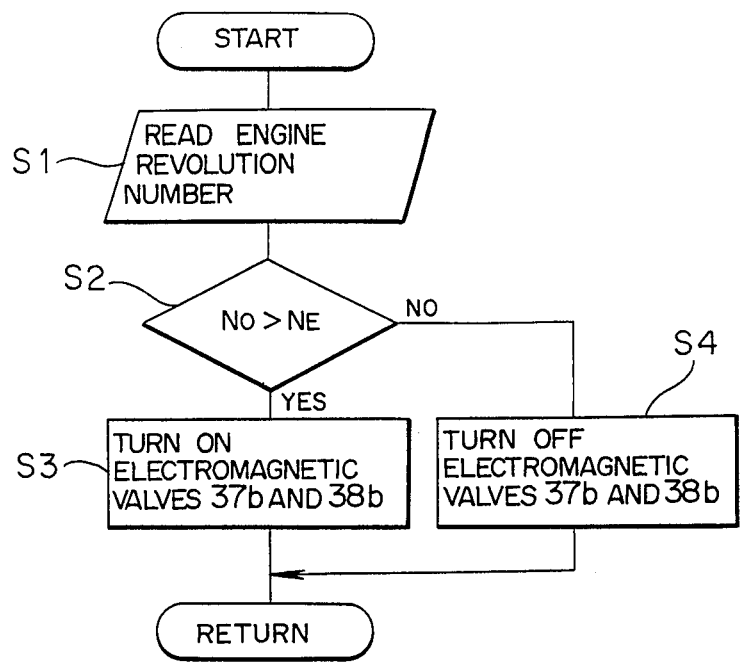
FIG. 13 is a flow chart showing the program of control steps followed by the controller of the embodiment shown in FIG. 11.

More specifically, in FIG. 13, the number of revolutions No of the engine 12 is fed into the controller 21 based on a signal from the revolution number sensor 20 in step S1. In step S2, the number of revolutions No of the engine 12 is compared with the first maximum value $N_E$ (the maximum value suitable for the low-load operation of the engine) of the number of revolutions of the engine 12 which is stored in the ROM beforehand. When it is determined that the current number of revolutions No exceeds the first maximum value $N_E$ (No>$N_E$), the operation shifts to step S3. When $N_o$ is below $N_E$ ($N_o \leq N_E$), the operation shifts to step S4. In step S3, the electromagnetic valves 36b and 38b are turned on. In step S4, the electromagnetic valves 37b and 38b are turned off.

Operation of the embodiment of the aforesaid construction will be described.

Figure 14:
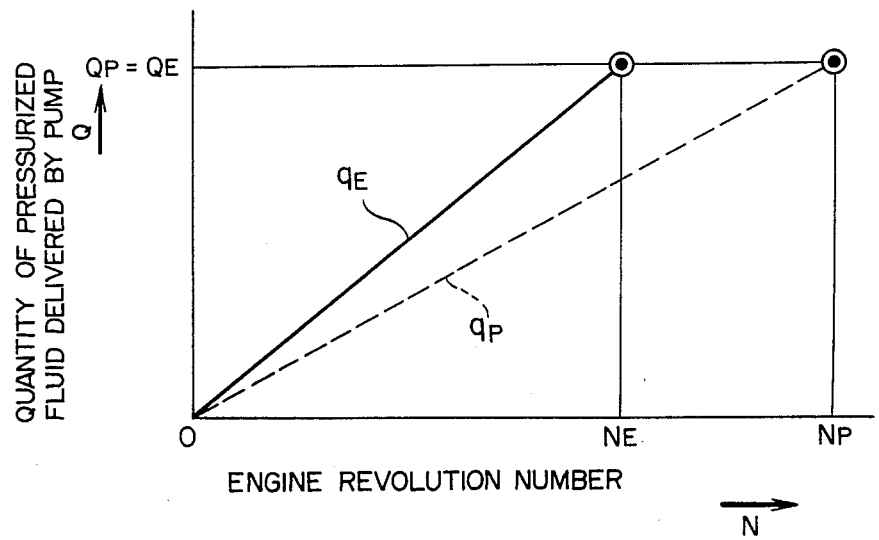
FIG. 14 is a diagrammatic representation of the relation between the number of revolutions N of the engine and the quantity of pressurized fluid Q delivered by the pump in the embodiment shown in FIG. 11.

(1) When the Number of Revolutions of the Engine is below the First Maximum Value $N_E$ suitable for a Low-Load Operation Control is effected in the same manner as described by referring to the embodiments shown in FIGS. 1-10. As shown in FIG. 14 which shows the N-Q line, the quantity of pressurized fluid Q delivered by the pump increases in proportion to the engine revolution number N. When the engine revolution number has the first maximum value $N_E$, the P-Q line is as indicated by a one-dot chain line E in FIG. 7.

(2) When the Number of Revolutions of the Engine Exceeds the First Maximum Value $N_E$ suitable for a Low-Load Operation When the number of revolutions of the engine exceeds the first maximum value $N_E$ as a result of the operation of the engine control lever 13f (see FIG. 3), the electromagnetic valve 38b is turned on and the en-circuit pressure is introduced into the actuator 38a to thereby continuously increase the number of revolution of the engine 12 to the second maximum value NP. At the same time the electromagnetic valve 37b is turned on and pressurized fluids at the front and rear of the throttle 36 which differ from each other in pressure are led to the two inlet ports of the actuator 37a for controlling the maximum tilting angle of the swash plate of the pump 14. The difference in pressure between the pressurized fluids at the front and rear of the throttle 36 can be expressed by a function of the quantity of pressurized fluid Q delivered by the fixed displacement volume hydraulic pump 31 or the number of revolutions of the engine 12. Thus control is effected in such a manner that, while the number of revolutions of the engine 12 continuously increases between the first maximum value $N_E$ and second maximum value $N_P$, the displacement volume of the pump decreases continuously from $q_E$ to $q_P$ ($<q_E$) in accordance with the number of revolutions of the engine 12. In this case, by setting the resilience of the spring 37d in the actuator 37a and the amount of the pressurized fluid throttled by the throttle 36 at suitable levels, it is possible to keep constant the quantity of pressurized fluid Q delivered by the pump 14 in a range of greater number of revolutions of the engine 12 than the first maximum value $N_E$, as indicated by the N-Q line in FIG. 14. When the number of revolutions of the engine 12 is the second maximum value $N_p$, the P-Q line is as indicated by a solid line P in FIG. 7 referred to hereinabove.

The embodiment enables the same results to be achieved as described by referring to the embodiments shown in FIGS. 1-10. In the embodiment, the maximum displacement volume is the second maximum value $q_E$ when the number of revolutions of the engine 12 is in a low horsepower range of below the first maximum value $N_E$ suitable for a low-load operation, and the number of revolutions of the engine 12 is increased in accordance with the load pressure of the hydraulic motor 11, and the maximum tilting angle of the swash plate of the pump is reduced with the increase in the number of revolutions of the engine in a high horsepower range of above the first maximum value $N_E$ of the number of revolutions of the engine 12, thereby continuously reducing the maximum displacement volume from the second maximum value $q_E$. This offers the advantage that, when the number of revolutions of the engine 12 exceeds the first maximum value $N_E$, there is no risk that the maximum value of the number of revolutions of the engine 12 and the maximum value of the displacement volume of the pump 14 might show sudden fluctuations. This is conductive to improved operability of the machinery and prolonged service life thereof.

Fourth Embodiment

Figure 15:
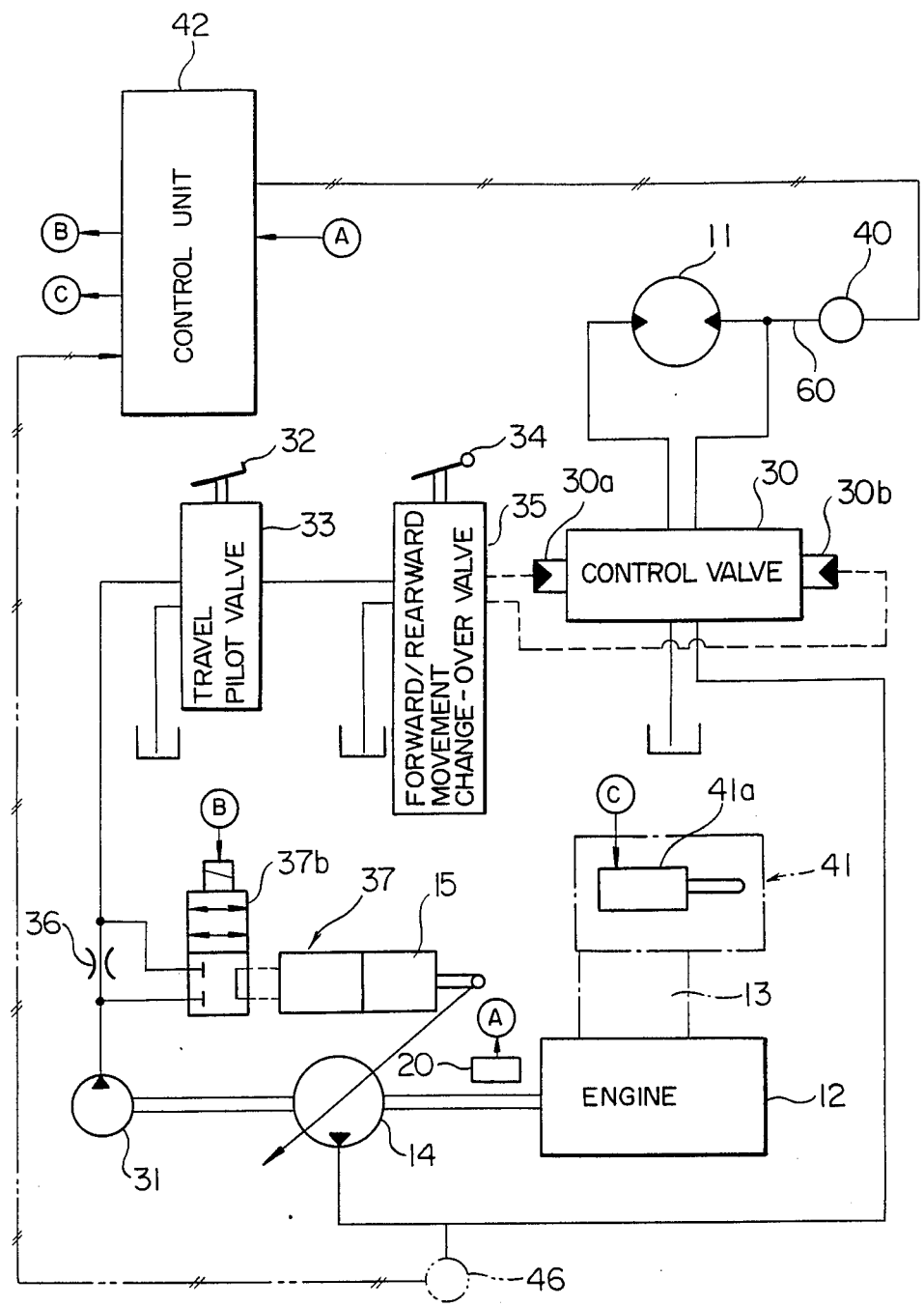
FIG. 15 is a circuit diagram of a control system of fourth embodiment of the invention.

A fourth embodiment will be described by referring to FIG. 15. In this embodiment, the pressure at a forward movement port of the hydraulic motor 11 is sensed by a pressure sensor 40, and the number of revolutions of the engine 12 is controlled in accordance with an output voltage of the pressure sensor 40 in a range of the numbers of revolutions of the engine 12 in which the number of revolutions exceeds the first maximum value $N_E$. Other parts of the system are similar to the corresponding parts of the system shown in FIG. 3.

More specifically, a linear solenoid device 41a is used in place of the hydraulic cylinder 38a in maximum engine revolution number altering means 41, to control the angle of pivotal movement of the lever 13a (see FIG. 3). The output voltage of the pressure sensor 40 is read into a control unit 42 which produces a signal commensurate with the voltage and supplies the same to the linear solenoid device 41a which controls the maximum value of the number of revolutions of the engine 12.

In the embodiment, the output voltage of the pressure sensor 40 is inputted to the control unit 41 which produces a signal corresponding to the input voltage and supplies the same to the linear solenoid device 41a. By this arrangement, the risk that, when the pressure at the forward movement port of the hydraulic motor 11 shows very large fluctuations, the maximum value of the number of revolutions of the engine 12 might be affected by such fluctuations in pressure can be avoided.

Fifth Embodiment

Figure 16:
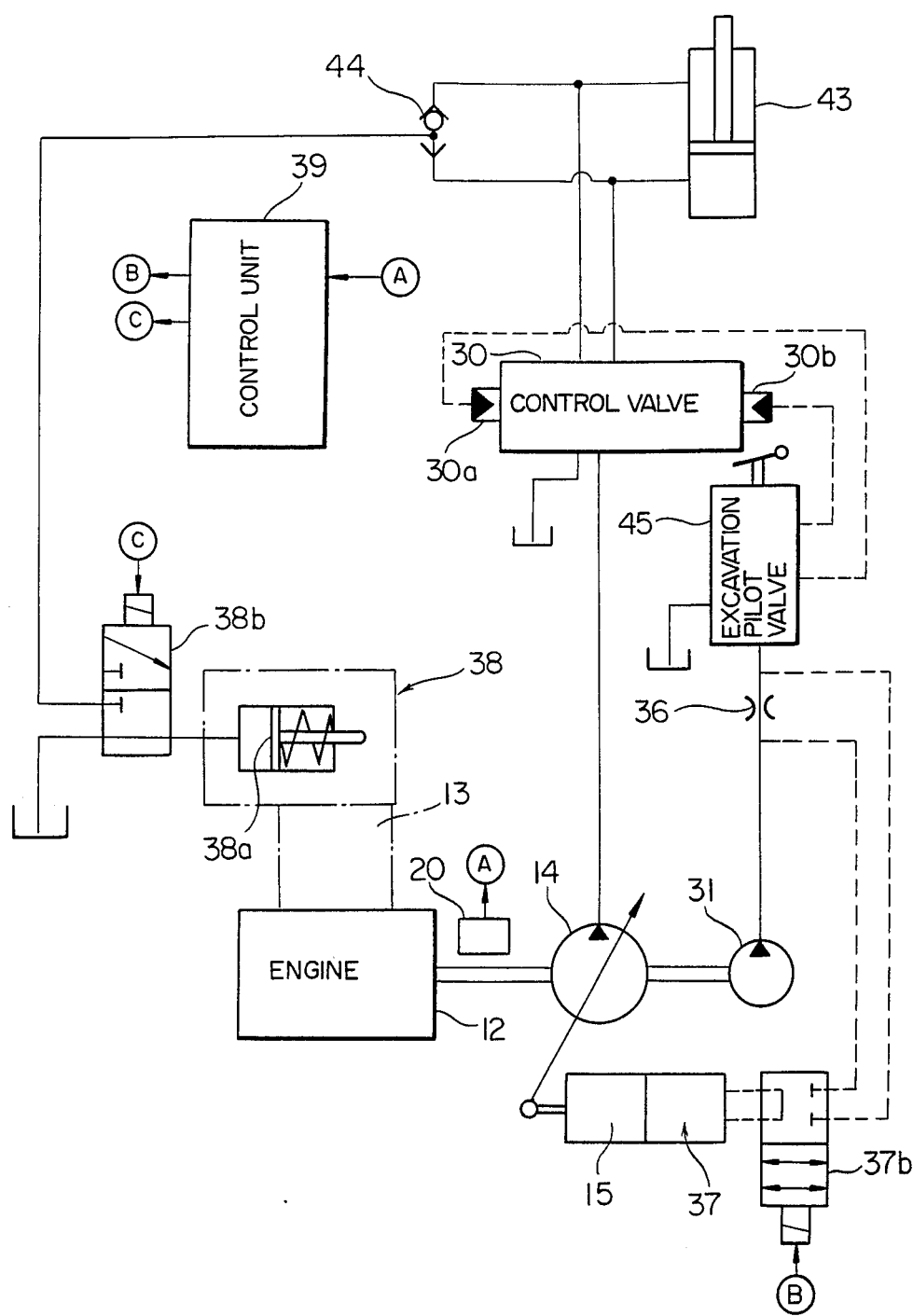
FIG. 16 is a circuit diagram of a control system of fifth embodiment of the invention.

A fifth embodiment will be described by referring to FIG. 16. This embodiment is an example of the application of the invention in an excavator circuit. The system is intended to control, in a range of the numbers of revolutions of the engine 12 exceeding the first maximum value $N_E$, the maximum value of the number of revolutions of the engine 12 in accordance with pressures at inlet and outlet ports of an excavation cylinder 43.

More specifically, the control valve 30 is connected to the excavation cylinder 43 which is connected at its inlet and outlet ports to the electromagnetic valve 38b via a shuttle valve 44. The control valve 30 is switched by an excavation pilot valve 45 receiving a supply of pressure from the fixed displacement volume hydraulic pump 31. The embodiment is similar in other respects to the embodiment shown in FIG. 11.

In the embodiment, in a range of the number of revolutions of the engine 12 below the first maximum value $N_E$, the maximum engine revolution number altering means 38 and maximum displacement volume altering means 37 are not rendered operative and the number of revolutions of the engine 12 is controlled by means of the engine control lever 13f (see FIG. 3) in the cab, while the maximum displacement volume of the pump 14 is kept at the second maximum value $q_E$. As a result, the N-Q line shown in FIG. 14 is obtained, and the P-Q line at the number of revolutions $N_E$ is as indicated by a one-dot chain line E in FIG. 7.

Meanwhile, in a range of the numbers of revolutions of the engine 12 exceeding the first maximum value $N_E$, the maximum engine revolution number altering means 38 and maximum displacement volume altering means 37 are rendered operative to effect control such that the maximum value of the number of revolutions of the engine 12 increases as the pressures at the inlet or outlet ports of the excavation cylinder 43 rise, and that the maximum displacement volume of the hydraulic pump 14 decreases as the quantity of pressurized fluid delivered by the hydraulic pump 31 or the number of revolutions of the engine 12 increases. At this time, the maximum displacement volume is controlled such that, in the same manner as described hereinabove, the quantity of pressurized fluid delivered by the hydraulic pump 14 is kept at a constant.

This embodiment offers the same advantage as that offered by the third embodiment. Namely, it is possible to automatically switch the mode of operation from the heavy-excavation operations in a range of the numbers of revolutions exceeding the first maximum value $N_E$ which suit a low-load operation for performing light-excavation to operations in a range of the numbers of revolutions below the first maximum value $N_E$. This enables an output power of the engine 12 and the consumption horsepower of the pump 14 matching the load to be obtained, thereby improving fuel consumption and noises as well as operability.

In this embodiment, the pressures at the inlet and outlet ports of the excavation cylinder 43 may be sensed by means of a pressure sensor as is the case with the fourth embodiment.

Sixth Embodiment

Figure 17:
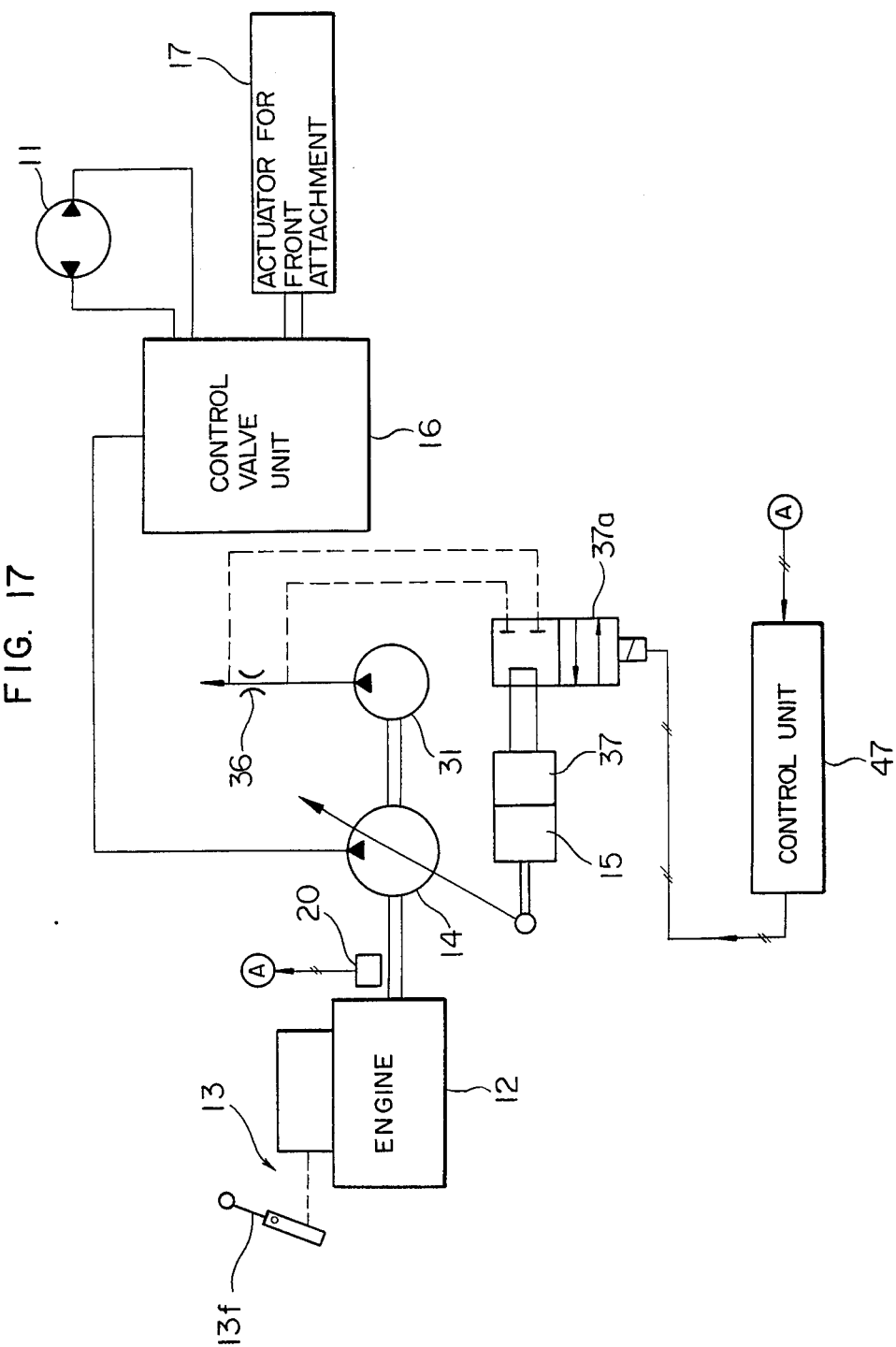
FIG. 17 is a circuit diagram of a control system of sixth embodiment of the invention.

FIG. 17 shows a sixth embodiment in which control of the number of revolutions of the engine is effected, when the number of revolutions has exceeded the first maximum value $N_E$, by means of the revolution number control means 13 in the same manner as control of the number of revolutions of the engine is effected when the number is below the first maximum value $N_E$, without using special altering means, such as the means 38 and 41, for example, used in the embodiments 3–5. In other respects, the embodiment is substantially similar to the third to fifth embodiments.

More specifically, a control unit designated by the reference numeral 47 is connected at its inlet port to the revolution number sensor 20 and at its outlet port to the electromagnetic valve 37b. A program shown in FIG. 18 is stored beforehand in the ROM in the control unit 47, to turn on and off the electromagnetic valve 37b in accordance with the number of revolutions of the engine 12.

Figure 18:
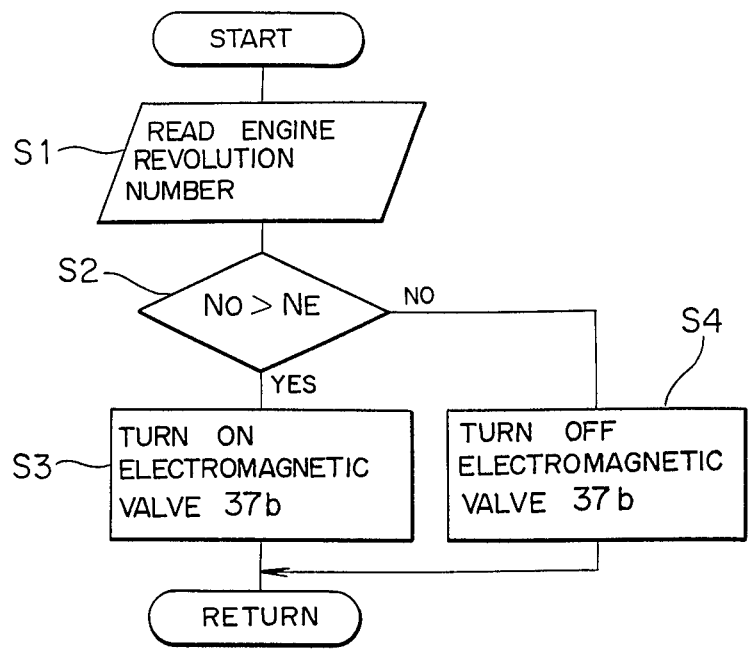
FIG. 18 is a flow chart showing the program of control steps followed by the controller of the embodiment shown in FIG. 17.

Referring to FIG. 18, the number of revolutions No of the engine 12 is read into the control unit 47 based on a signal from the revolution number sensor 20 in step S1. In step S2, the number of revolutions No is compared with the first maximum value $N_E$ of the engine 12 stored in the ROM beforehand. When it is determined that the current number of revolutions No exceeds the first maximum value $N_E$ (No>$N_E$) the operation shifts to step S3; when the number of revolutions No is below the first maximum value $N_E$ (No≦$N_E$), the operation shifts to step S4. In step S3, the electromagnetic valve 37b is turned on; in step 4, it is turned off.

Operation of the embodiment of the aforesaid construction will be described. When the number of revolutions of the engine 12 is below the first maximum value $N_E$ suitable for a low-load operation, the maximum displacement volume of the pump 14 is set at the second maximum value $q_E$ and the number of revolutions of the engine 12 has a value commensurate with the amount of operation of the engine control lever 13f in the cab, as is the case with the embodiments shown and described in the preceding description.

When the number of revolutions No is determined to exceed the first maximum value $N_E$ suitable for a low-load operation, the electromagnetic valve 37b is turned on, and control is effected, as in the third to the fifth embodiments, in such a manner that, when the number of revolutions ranges from the first maximum value $N_E$ to the second maximum value $N_P$, the maximum displacement volume of the pump 14 changes from the second maximum value $q_E$ to the first maximum value $q_P$ in accordance with the number of revolutions of the engine 12. As a result, the quantity of pressurized fluid delivered by the pump is kept at a constant, as indicated by the P-Q line shown in FIG. 14, in a range of the numbers of revolutions greater than the first maximum value $N_E$.

In this embodiment, control is effected by operating the engine control lever 13f through the entire range of the numbers of revolutions of the engine 12. As a result, the system is simple in construction and high in operability.

In the third to the sixth embodiments described hereinabove, control of the maximum displacement volume of the hydraulic pump is effected without using the pressure of the hydraulic circuit of the working actuators 11 and 43. However, the pressure of this hydraulic circuit can be used for effecting control of the maximum displacemnat volume of the hydraulic pump 14 as it is used for controlling the maximum number of revolutions of the engine 12 in the third to the fifth embodiments. The pressure of the hydraulic circuit used has described as being that of pressurized fluid obtained from between the hydraulic motor 11 or hydraulic cylinder 43 and the control valve 30. However, the invention is not limited to this specific arrangement, and a pressure sensor 46 may be connected between the control valve 30 and hydraulic pump 14 as indicated by a two-dots chain line in FIG. 15 so as to sense the pressure at which hydraulic fluid is delivered by the pump 14. This enables a signal to be obtained which is proportional to the size of a load applied to the hydraulic actuators 11 and 43.

The load applied to the hydraulic actuators 11 and 43 may be sensed not only by sensing a pressure but also by detecting the difference between the number of revolutions indicated by the engine control lever 13f and the actual number of revolutions or a deviation in the number of revolutions. A strain gauge may be attached to the rotary shaft of the hydraulic motor to detect the actual load.

The electromagnetic actuator used for controlling the maximum revolutions of the engine 12 in the fourth embodiment may be used for controlling the maximum displacement volume of the hydraulic pump.

Seventh to Ninth Embodiments

Seventh to ninth embodiments of the invention will be described by referring to FIGS. 19-26. In the drawings, parts similar to those described by referring to the embodiments shown in FIGS. 1-9 and parts used commonly in the seventh to the ninth embodiments are designated by like reference characters.

The seventh to the ninth embodiments are distinct from the embodiments shown and described previously in that control means 53, 56 responsive to information on the operation mode supplied from information provider means 25, 54, 55 controls engine revolution number altering means 52 and maximum displacement volume altering means 19 in such a manner that, when the information indicates a low-load operation, a first combination in which the maximum displacement volume of the hydraulic pump 14 has the second maximum value $q_E$ and the number of revolutions of the engine 12 has a small value is used, and that, when the information indicates a high-load operation, a second combination in which the maximum displacement volume of the hydraulic pump 14 has the first maximum value $q_P$ and the number of revolutions of the engine 12 has a large value is used.

Seventh Embodiment

Figure 19:
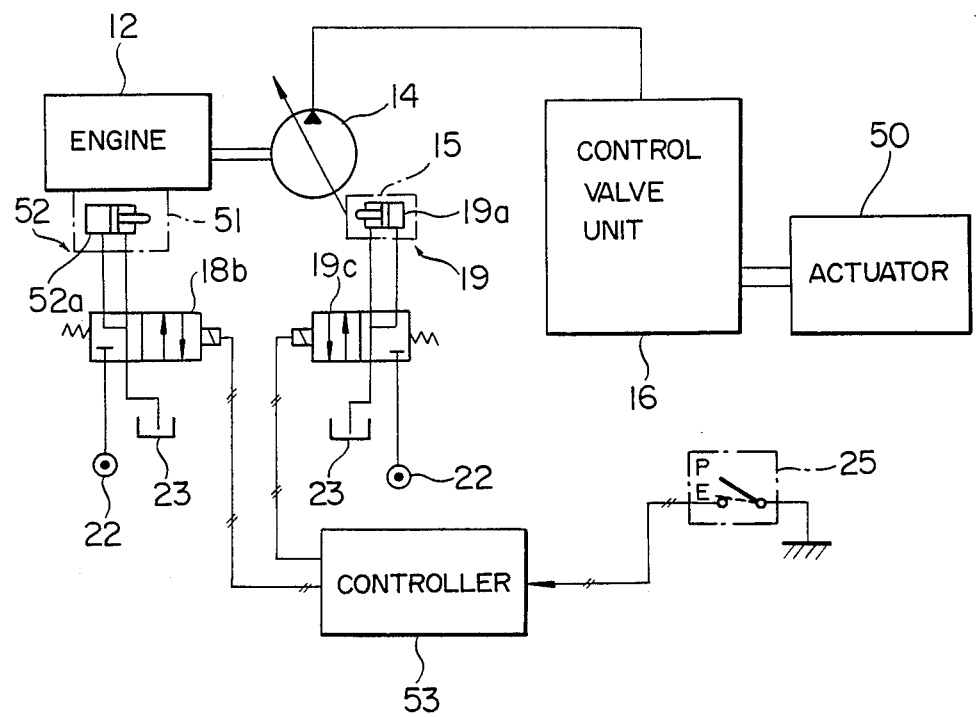
FIG. 19 is a circuit diagram of a control system of seventh embodiment of the invention.
Figure 20:
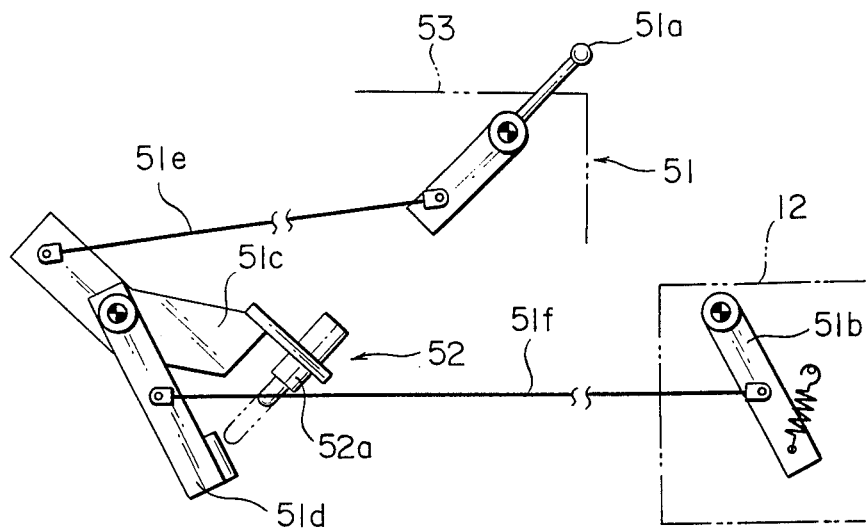
FIGS. 20a, 20b and 20c are schematic views showing the construction and operation of the revolution number control means and maximum revolution number altering means of the embodiment shown in FIG. 19.
Figure 20:
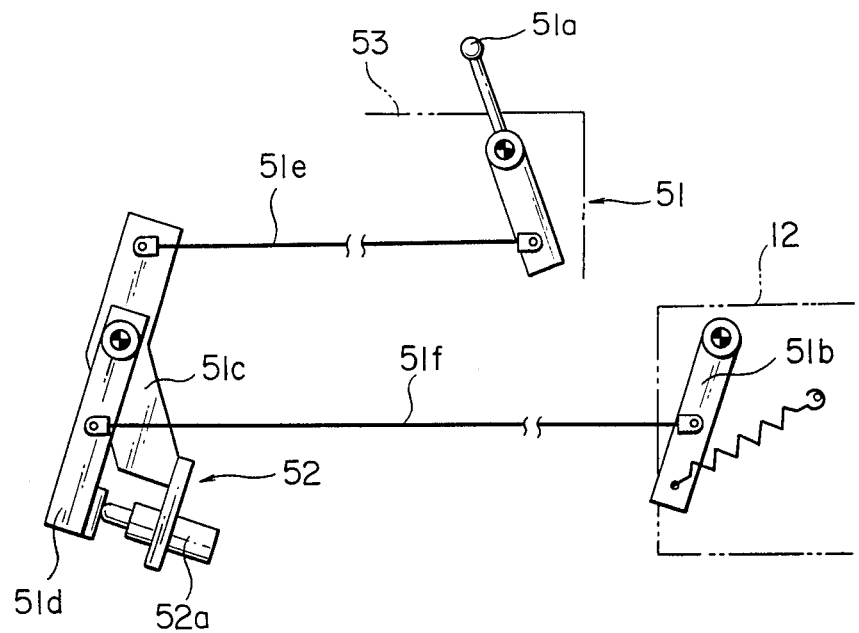
Figure 20:
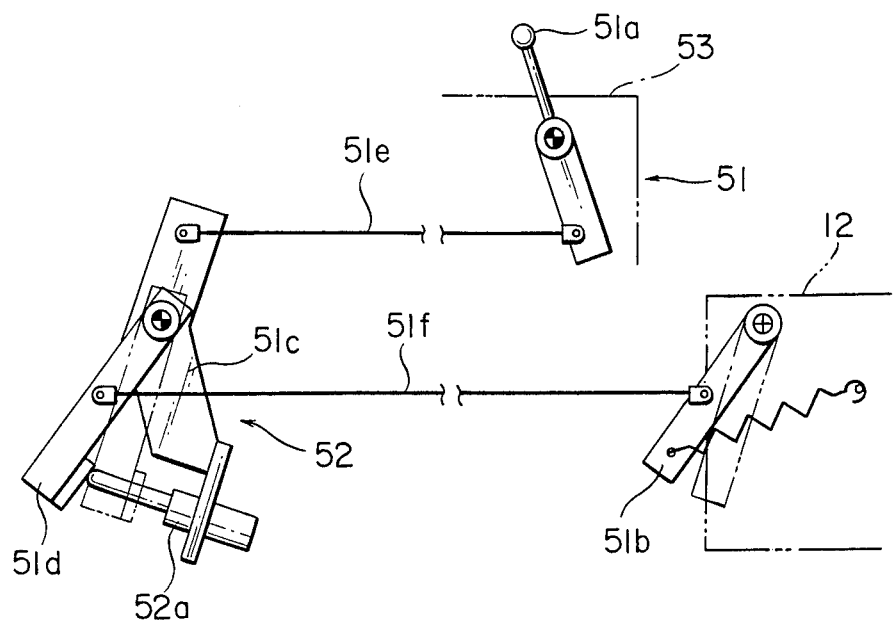

FIG. 19 shows a seventh embodiment in which an outlet port of the variable displacement hydraulic pump 14 driven by the engine 12 constituting a prime mover is connected via a control valve unit 16 to actuators 50 which include a travel hydraulic motor, an excavation cylinder (the hydraulic cylinders 5-7 in FIG. 1) and a swing motor. Each valve in the control valve unit 16 is switched by means of a corresponding operation lever, not shown.

The displacement volume of the variable-displacement hydraulic pump 14 is controlled by the pump regulator 15 in accordance with a pressure in the circuit, and its maximum value is varied by the maximum displacement volume altering means 19. The altering means 19 comprises the hydraulic actuator 19a which is expanded and contracted to switch the maximum displacement volume in two stages. The hydraulic actuator 19a is connected via the electromagnetic valve 19c to the pressure source 22 and reservoir 23.

The number of revolutions of the engine 12 is controlled by engine revolution number control means 51 comprising a control lever 51a (see FIGS. 20a, 20b and 20c). Mounted in association with the engine revolution number control means 51 is engine revolution number altering means 52 which alters, irrespective of the value of the number of revolutions controlled thereby, the number of revolutions by a predetermined amount to enable the number of revolutions to be provided both in a large value and in a small value.

More specifically, the engine revolution number control means 51 comprises, as shown in FIGS. 20a-20c, an engine control lever 51a mounted in the cab, a governor throttle lever 51b in the engine 12 and two intermediate levers 51c and 51d located between the engine control lever 51a and the governor throttle lever 51b. The engine revolution number altering means 52 is mounted in a manner to act in conjunction with the engine control lever 51a and the first intermediate lever 51c. Referring to FIG. 20a, the engine control lever 51a is supported through a shaft by a console box 53 in the cab and connected, through a push-pull cable 51e to one end portion of the first intermediate lever 51c supported through a shaft at a suitable location of the vehicle. The first intermediate lever 51c is bent at its middle to be substantially in the form of a lever V and has a hydraulic cylinder 52a of the engine revolution number altering means 52 at an opposite end portion. The second intermediate lever 51d is supported coaxially with the first intermediate lever 51c, and the pivotal movement of the first intermediate lever 51c is transmitted to the second intermediate lever 51d through the hydraulic cylinder 52a. The second intermediate lever 51d is connected through a push-pull cable 51f to the governor throttle lever 51d. The hydraulic cylinder 52a is connected via the electromagnetic valve 18b to the hydraulic pressure source 22 and the reservoir 23.

In FIG. 20a, the engine control lever 51a is in an OFF position and the hydraulic cylinder 52a is in a contracted position. At this time, the engine 12 is inoperative. Even if the hydrauic cylinder 52a is brought to an expanded position, the second intermediate lever 51d does not move in pivotal movement. In FIG. 20b, the engine control lever 51a is shown as being operated to a maximum position and the hydraulic cylinder 52a is in the contracted position. At this time, the engine 12 rotates with the number of revolutions which has the first maximum value $N_E$. FIG. 20c shows the hydraulic cylinder 52 having been brought to an expanded position from the contracted position shown in FIG. 20b. It will be seen that the second intermediate lever 51d has moved in pivotal movement through an angle corresponding to the length of expansion of the hydraulic cylinder 52a, to enable the engine 12 to rotate with the number of revolutions which has the second maximum value $N_P$.

Figure 21:
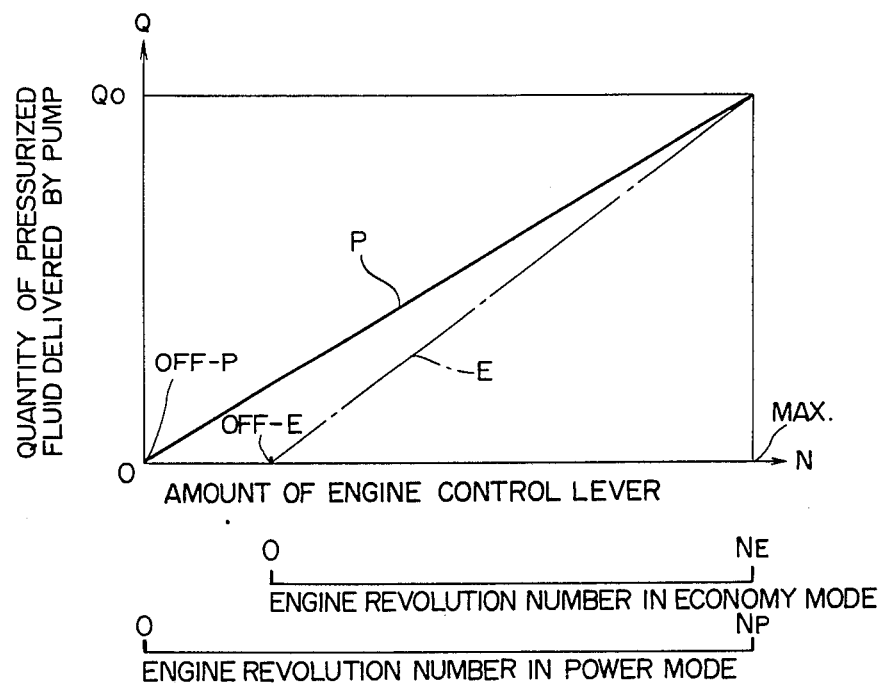
FIG. 21 is a diagram showing the amount of operation of the engine control lever in relation to the quantity of pressurized fluid delivered by the pump and the number of revolutions of the engine.

Referring to FIG. 21, the amount of operation of the engine control lever 51a in relation to the number of revolutions of the engine and the quantity of pressurized fluid delivered by the hydraulic pump will be described in detail.

In an economy mode in which the hydraulic cylinder 52a is in the contracted position, the engine 12 is rendered inoperative when the engine control lever 51a is brought to an OFF-E position. Assume that the number of revolutions is zero when the lever 51a is in the OFF-E position. Then it is possible to control the number of revolutions of the engine from zero to the first maximum value $N_E$ by operating the engine control lever 51a from the OFF-E position to the maximum position (see FIG. 20b). Also assume that, at this time, the displacement volume of the pump is constant at the second maximum value $q_E$. Then, it is possible to control the quantity of pressurized fluid delivered by the pump from zero to Qo as indicated by a one-dot chain line E. In FIG. 20a, the engine control lever 51a is shown in an OFF-P position. As can be seen in FIGS. 20a and 21, the engine control lever 51a has play in the range between OFF-E and OFF-P when the hydraulic cylinder 52a is in the contracted position.

In a power mode in which the hydraulic cylinder 52a is in the expanded position, the prime mover is rendered inoperative when the engine control lever 51a is brought to the OFF-P position shown in FIG. 21. Assume that the number of revolutions of the engine is zero when the engine control lever 51a is in the OFF-P position. Then, it is possible to control the number of revolutions of the engine from zero to the second maximum value $N_p$ by operating the engine control lever 51a from the OFF-P position to the maximum position (see FIG. 20c). Also assume that, at this time, the displacement volume of the pump is constant at the first maximum value $q_P$. Then it is possible to control the quantity of pressurized fluid delivered by the pump from zero to Qo.

The first maximum value $N_E$ of the number of revolutions of the engine is set such that it is possible, when the tilting angle of the swash plate of the pump or the displacement volume of the pump has the second maximum value $q_E$, to develop a speed of 35 km/h for a travel on a flat road or to perform excavation at a desired speed, with a minimum necessary horsepower. The first maximum value $N_E$ of the engine and the second maximum value $q_E$ of the pump are the maximum number of revolutions and maximum displacement volume suitable for a low-load operation. The second maximum value $N_p$ of the engine is set such that it is possible, when the tilting angle of the swash plate of the pump or the displacement volume of the pump has the first maximum value $q_p$, to develop a speed of 35 km/h for a travel on an uphill road of a predetermined gradient with a minimum necessary horsepower. The second maximum value $N_P$ of the engine and the first maximum value $q_P$ of the pump are the maximum number of revolutions and maximum displacement volume suitable for a high-load operation.

Referring to FIG. 19 again, the reference numeral 53 designates a controller in the form of a microcomputer, for example, which has a mode change-over switch 25 constituting selection means connected to its inlet port. The mode change-over switch 25, which is capable of switching the system between a power mode (P) and an economy mode (E), may be in the form of a toggle switch. The controller 53 has connected to its outlet ports the electromagnetic valve 19c connected to the hydraulic cylinder 19a for altering the maximum tilting angle and the electromagnetic valve 18b connected to the engine revolution number altering hydraulic cylinder 52a. The electromagnetic valves 18b and 19c respond to the positions of the mode change-over switch 25 in such a manner that, when the mode change-over switch 25 moves to a power mode position, the electromagnetic valves 18b and 19c are turned on, and when it moves to an economy mode position, they are turned off.

Operation of the embodiment of the aforesaid construction will be described.

(1) Power Mode Operation

When the mode change-over switch 25 moves to the power mode position, the electromagnetic valve 19c is turned on to bring the hydraulic cylinder 19a into communication with the pressure source 22. This actuates the hydraulic cylinder 19a of the maximum displacement volume altering means 19, so that the maximum displacement volume is set at the first maximum value $q_P$. At this time, the electromagnetic valve 18b of the engine revolution number altering means 18 is also turned on and the hydraulic cylinder 52a is expanded. Thus, by pulling the engine control lever 51a in the cab to the full, it is possible to increase the number of revolutions of the engine to the second maximum value $N_P$ through the second intermediate lever 51d, as shown in FIG. 20c.

Figure 22:
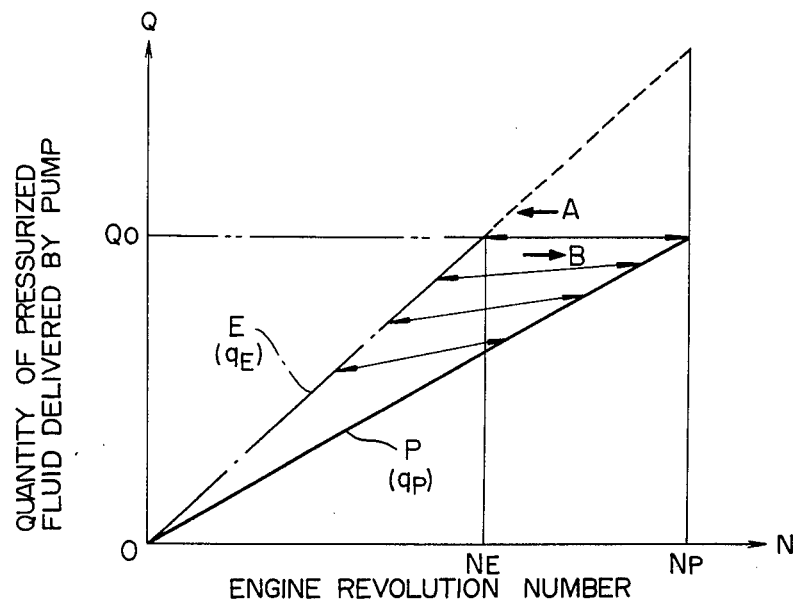
FIG. 22 is a diagram showing the relation between the number of revolutions N of the engine and the quantity of pressurized fluid Q delivered by the pump.

So long as the maximum displacement volume of the hydraulic pump 14 has the first maximum value $q_P$ in a range of low pressures (less than a pressure P2, see FIG. 23), the quantity of pressurized fluid delivered by the pump increases as indicated by a solid line P in FIG. 22 in proportion to an increase in the number of revolutions of the engine. In this case, the P-Q line of the pump when the number of revolutions of the engine in $N_P$ is as indicated by a solid line P in FIG. 23.

(2) Economy Mode Operation

When the mode change-over switch 25 is moved to the economy mode position, the electromagnetic valve 19c is turned off and the hydraulic cylinder 19a is communicated with the reservoir 23, thereby altering the maximum displacement volume to the second maximum value $q_E(>q_P)$. At this time, the electromagnetic valve 18b is turned off and the hydraulic cylinder 52a is contracted. Thus, even if the engine control lever 51a in the cab is pulled to the maximum, the number of revolutions of the engine 12 is limited to the first maximum value $N_E(<N_P)$ because the amount of the pivotal movement of the second intermediate lever 51b is reduced by an amount corresponding to the amount of the contraction of the hydraulic cylinder 52a.

Consequently, so long as the maximum displacement volume of the hydraulic pump 14 has the second maximum value $q_E$ in a range of low pressures (less than a pressure P1, see FIG. 23), the quantity of pressurized fluid delivered by the pump increases as indicated by a one-dot chain line E in FIG. 22 in proportion to an increase in the number of revolutions of the engine. In this case, the P-Q line of the pump when the number of revolutions of the engine is $N_E$ is as indicated by a one-dot chain line in FIG. 23.

Figure 23:
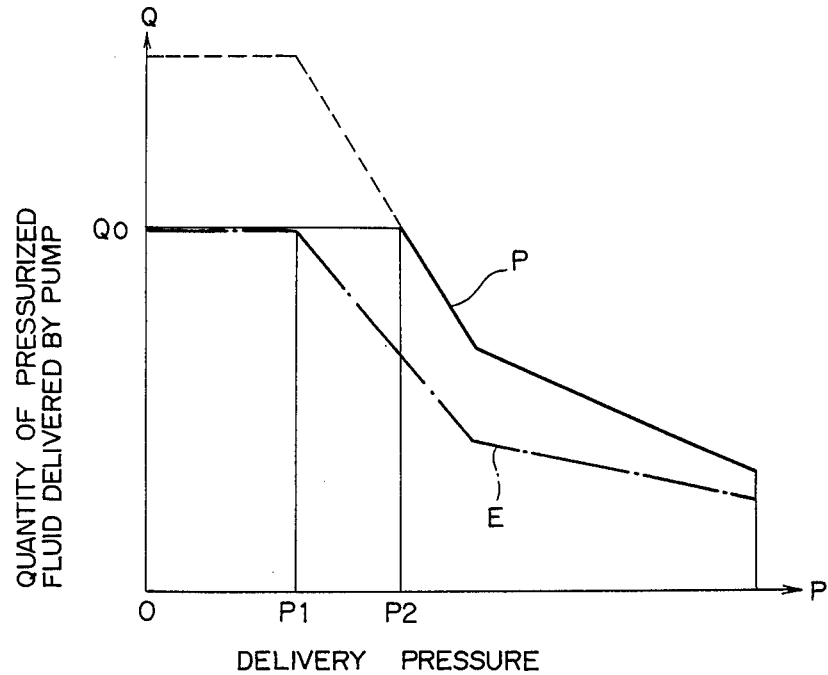
FIG. 23 is a view of the P-Q line of the hydraulic pump of the embodiment shown in FIG. 19.

In FIG. 23, a broken line curve indicates a P-Q line which will be obtained if the number of revolutions of the engine rises to the second maximum value $N_P$ when the displacement volume of the pump is switched to the second maximum value $q_E$.

(3) Mode Change-Over Operation

When the mode change-over switch 25 is moved to the economy mode position in the power mode operation, the electromagnetic valves 18b and 19c are turned off, thereby contracting the hydraulic cylinder 19c and altering the maximum displacement volume of the pump to the second maximum value $q_E$. The hydraulic cylinder 52a is also contracted, and the second intermediate lever 51d moves counterclockwise in FIG. 20c, so that the number of revolutions of the engine 12 is reduced by a predetermined value. Thus, no matter what the number of revolutions of the engine 12 may be in range, the system shifts from the power mode to the economy mode along an arrow A on the N-Q line in FIG. 22 while the quantity of pressurized fluid delivered by the pump 14 remains substantially constant. When the system shifts from the economy mode to the power mode, the operation of the parts concerned is in reverse to that described hereinabove. Thus the system shifts from the economy mode to the power mode along an arrow B on the N-Q line in FIG. 22 while the quantity of pressurized fluid delivered by the pump 14 remains substantially constant in all the range of the numbers of revolutions of the engine 12.

In this embodiment, the maximum displacement volume of the pump 14 is altered to $q_E(>q_P)$ and the number of revolutions of the engine 12 is limited to the first maximum value $N_E(<N_P)$ to bring the maximum quantity of pressurized fluid delivered by the pump 14 to $Q_0$ in the economy mode. By this arrangement, the same speed of operation including the same speed of travel is obtained in the economy mode and the power mode at the maximum quantity of pressurized fluid delivered by the pump 14 is maximized. This makes it possible, as shown in FIG. 9, to obtain a required horsepower PS2, to reduce the rate of fuel consumption to $q_2$ and to minimize noises, with the number of revolutions $N_{E1}$ of the engine 12, for example. Meanwhile considering that it is desired to obtain the maximum speed of 35 km/h when the quantity of pressurized fluid delivered by the pump 14 is $Q_0$, as can be seen in FIG. 23, it is possible to achieve the speed of 35 km/h when the delivery pressure of the pump 14 is up to $P_1$ (a pressure necessary for travelling on a flat road) in the economy mode. However, when the delivery pressure of the pump 14 exceeds $P_1$ in travelling uphill, for example, it is not possible to achieve the speed of 35 km/h. In the power mode, it, however, is possible to achieve the speed of 35 km/h until the delivery pressure of the pump 14 reaches $P_2$ (a pressure necessary for travelling uphill at an angle of $\theta$, for example).

Let us assume that an attempt is made, in a conventional pump, to reduce the pump consumption horsepower to economize on fuel consumption by reducing the number of revolution of the engine from $N_2$ to $N_{E1}$ (see FIG. 9) as is the case with this embodiment. In this case, since the maximum displacement volume of the pump is constant, the P-Q line will be as indicated by a broken line in FIG. 8 as described hereinabove and the quantity of pressurized fluid delivered by the pump will drop to $Q_0'$, making it impossible to achieve a predetermined speed.

Eighth Embodiment

Figure 24:
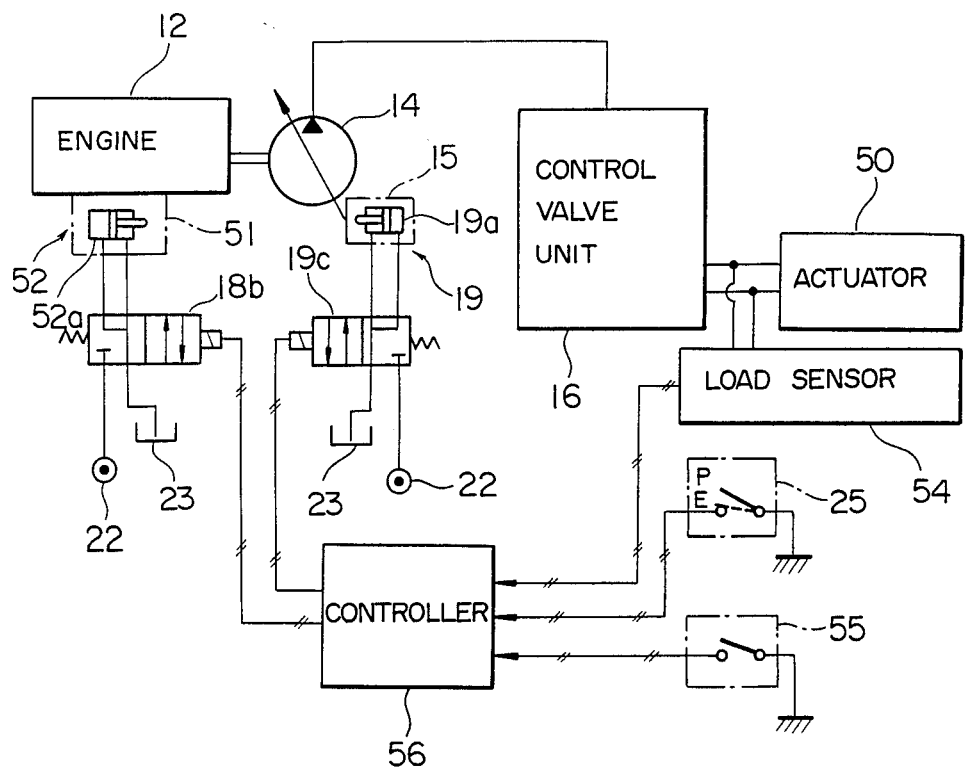
FIG. 24 is a circuit diagram of a control system of eighth embodiment of the invention.

An eighth embodiment will be described by referring to FIG. 24. This embodiment comprises, in addition to the parts of the seventh embodiment, a load sensor 54 and an automatic control selection switch 55 which are connected to inlet ports of a controller 56.

The load sensor 54 which senses a load applied to the actuator 50 is in the form of a pressure sensor for sensing the pressure of a hydraulic circuit between the control valve 16 and actuator 50. As is the case with the embodiments shown and described previously, the load sensor may be one which senses a deviation of the number of revolutions of the engine, or one which detects a mechanical load by means of a strain gauge. The pressure sensed may be the pressure in a line connecting the hydraulic pump 14 to the control valve 16.

The automatic control selection switch 55 can be moved between a manual operation position in which switching the system between power mode and economy mode is effected by manually operating the mode change-over switch 25 and an automatic operating position in which the switching is automatically effected in accordance with the load sensed by the sensor 54. The controller 56 controls the electromagnetic valves 18b and 19c in accordance with a program shown in FIG. 25.

Figure 25:
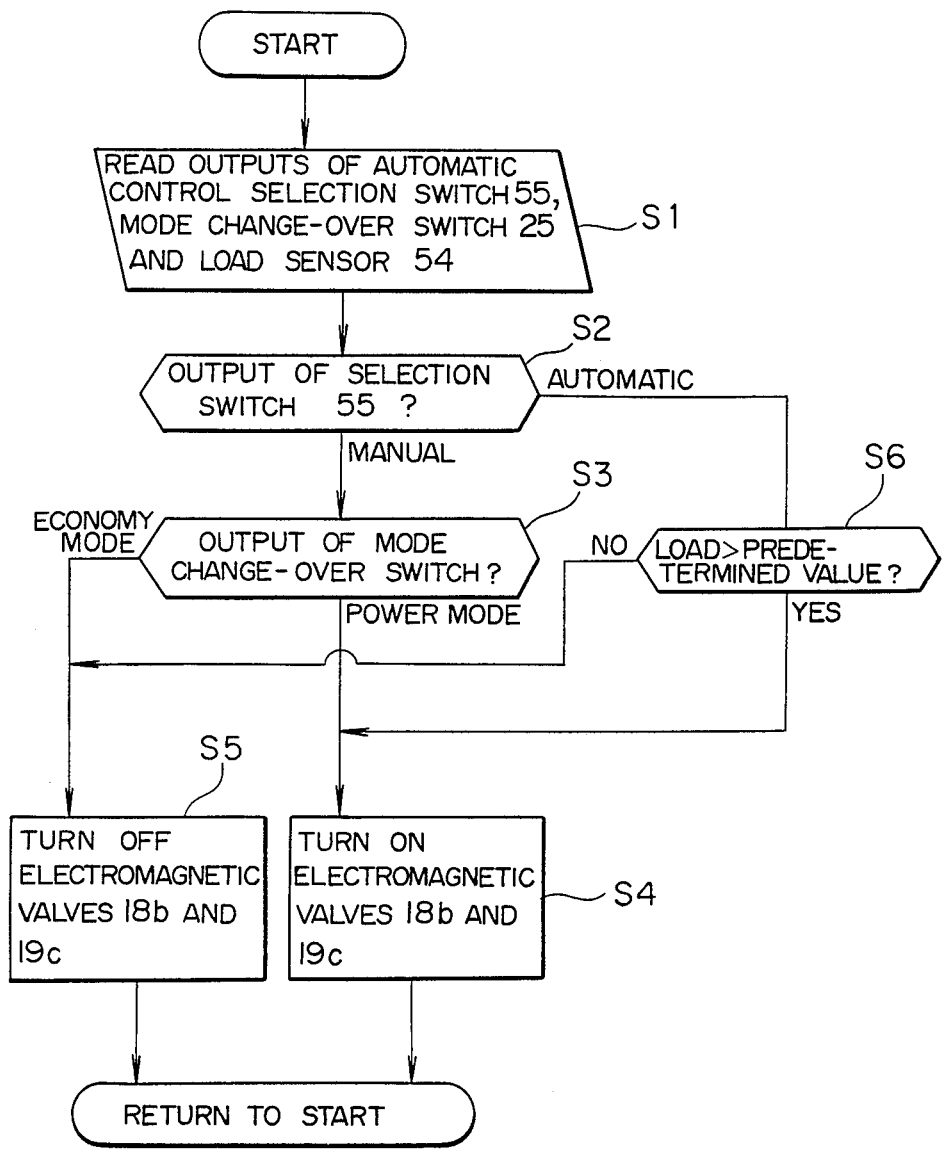
FIG. 25 is a flow chart showing the program of control steps followed by the controller of the embodiment shown in FIG. 24.

In FIG. 25, signals are read into the controller 56 from the sensor 54 and switches 25 and 55 in step S1. In step S2, it is determined whether the switch 55 is in the manual operation position or automatic operation position. If it is in the manual operation position, then it is determined in step S3 whether the switch 25 is in the power mode position or in the economy mode position. If it is in the power mode position, then the electromagnetic valves 18b and 19c are turned on in step S4. If it is in the economy mode, the electromagnetic valves 18b and 19c are turned off. Meanwhile, if the switch 55 is in the automatic operation position, then it is determined whether the sensed load is above a predetermined level in step S6. When it is above the predetermined level, the operation shifts to step S4; when it is below the predetermined level, the operation shifts to step S5.

This embodiment offers, in addition to the advantage offered by the seventh embodiment, the advantage that the operation mode can be automatically switched from the power mode to the economy mode and vice versa when the switch 55 selects the automatic operation position. This allows operations to be performed advantageously regardless of the skills of the operator.

Ninth Embodiment

A ninth embodiment will be described by referring to FIG. 26. The controller of this embodiment controls the electromagnetic valves 18b and 19c in accordance with a program shown in FIG. 26.

When automatic mode switching is effected in accordance with the program shown in FIG. 25, hunting may occur if the load of an actuator shows a fluctuation in the vicinity of the predetermined value. The program shown in FIG. 26 is intended to avoid the occurrence of hunting.

Figure 26A:
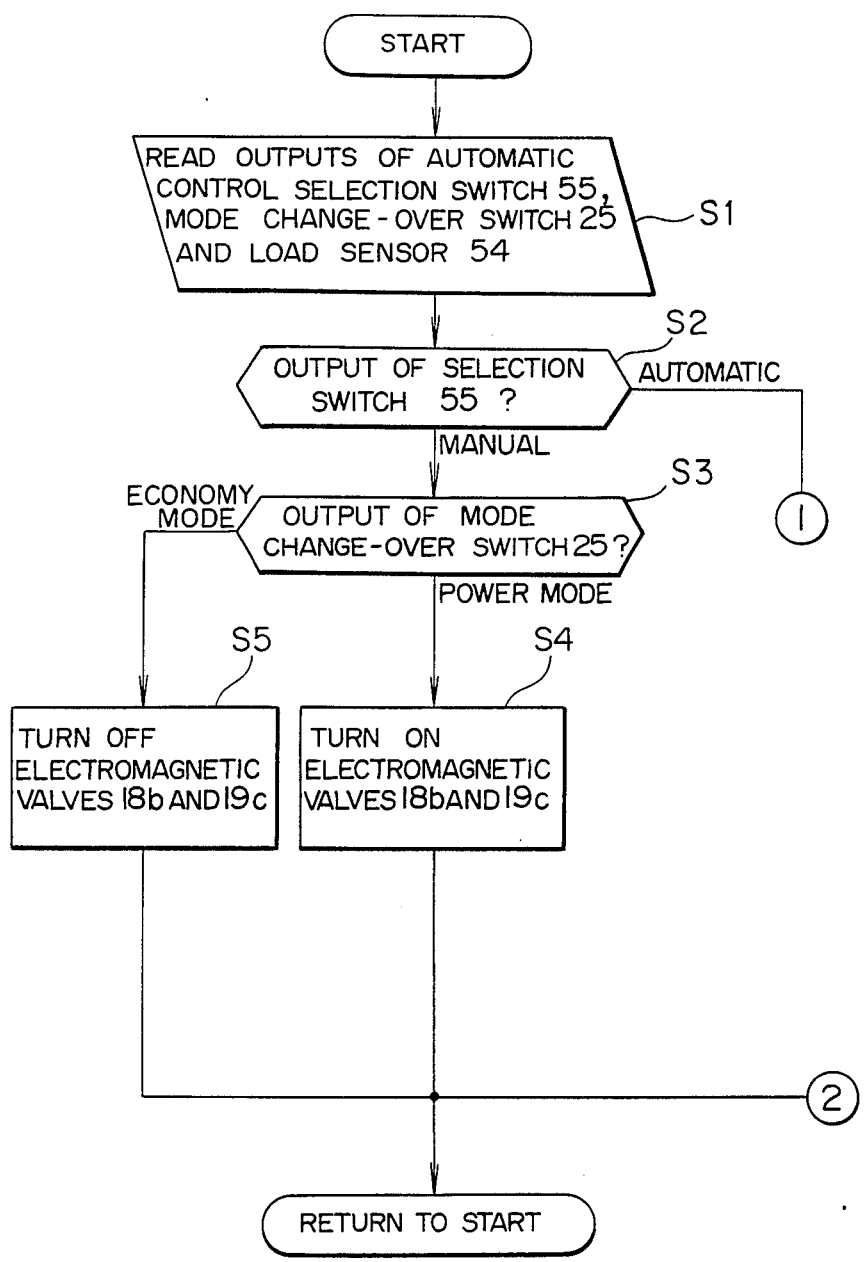
FIGS. 26a and 26b are a flow chart showing the program of control steps followed by the controller of a control system of ninth embodiment of the invention.
Figure 26B:
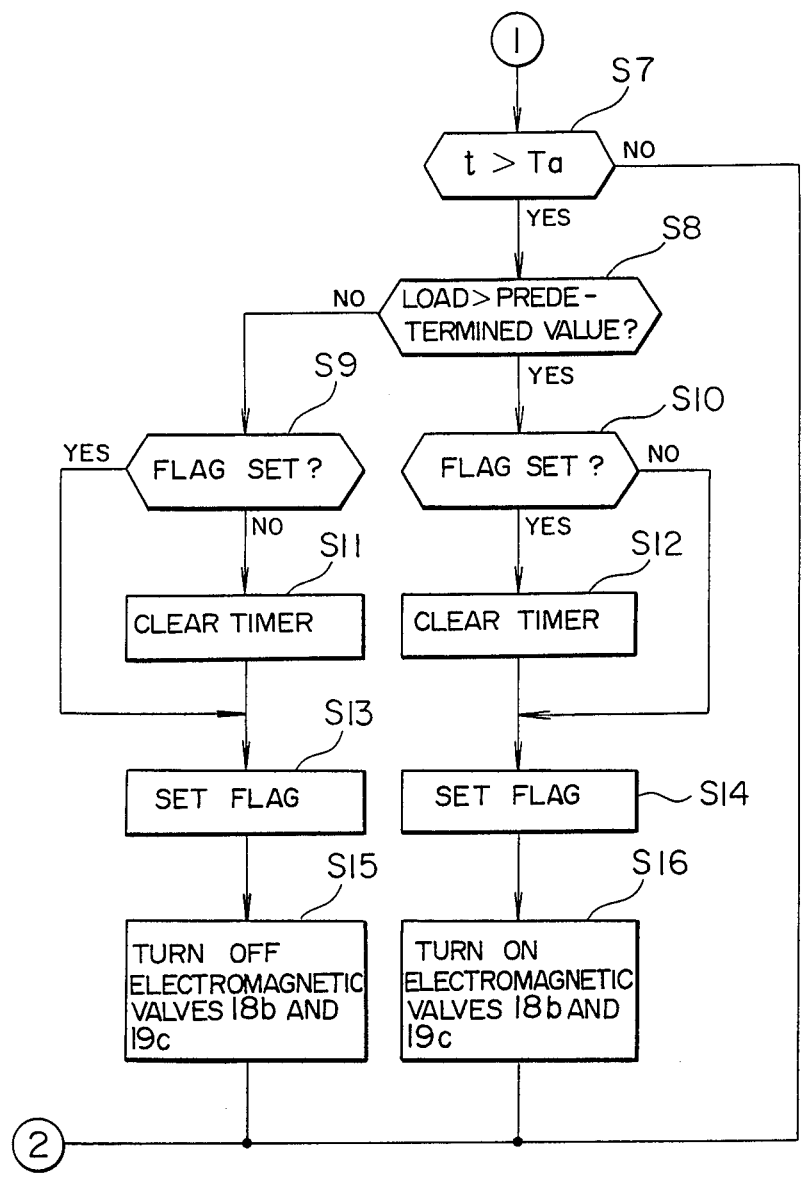

The program shown in FIG. 26 is such that, when the electromagnetic valves 18b and 19c are switched in accordance with a variation in the load of the actuator, the valves are kept in the predetermined position until a predetermined period of time elapses, regardless of the variation in the load, thereby preventing hunting from occurring. More specifically, if automatic control is selected in step S2, then it is determined in step S7 whether a time t elapsing after actuation of the selection switch 55 has exceeded a predetermined time Ta. The operation shifts to step S8 only when it is determined that the predetermined time Ta has been exceeded. In step S8, it is determined whether the sensed load is above a predetermined value. If it is below the predetermined value, the operation shifts to step S9; if it is above the predetermined value, the operation shifts to step S10. In steps S9 and S10, it is determined whether the flag is set. If it is determined that the flag is not set, then a timer counting the time t is cleared in steps S11 and S12, respectively. Then in step S13, the flag is set, and in step S14 it is cleared. Meanwhile, if it is determined in steps S9 and S10 that the flag is set, then the operation shifts directly to steps S13 and S14, respectively. Thereafter, the electromagnetic valves 18b and 19c are turned off in step S15 and turned on in step S16. In this way, the flag is checked to see if the load of the actuator has shown a variation in the vicinity of the predetermined value. When it determined to have shown a variation, the timer is cleared and no signal is allowed to enter the electromagnetic valve control loop before lapse of the predetermined time, so that the operation is returned to the start. This makes it possible to keep the system in the previous mode before lapse of the predetermined time, even if the load shows a variation.

In the embodiment, the number of revolutions of the engine 12 can be altered, simultaneously as the maximum displacement volume of the pump 14 is altered, between a large value and a small value in the entire range of the numbers of revolutions by the engine revoltuion number altering means 52. This ensures that, even if the system is switched from one operation mode to the other, no variation occurs in the quantity of pressurized fluid delivered by the pump 14.

In the foregoing description, the values of $q_P$, $N_P$, $q_E$ and $N_E$ are set in such a manner that the maximum quantity Qo of pressurized fluid delivered by the pump 14 ($Q_o = q_P \times N_P = q_E \times N_E$) is the same in the two modes. However, the maximum quantity Qo need not be strictly the same in the two modes, and the two modes may have substantially the same value as the maximum quantity. For example, the values of the maximum quantity for the two modes may vary such that the maximum speed of travel is in the range between 30 km/h and 35 km/h. In the foregoing description, alteration of the maximum displacement volume of the pump 14 and the number of revolutions of the engine 12 has been described as being controlled by means of a hydraulic cylinder. However the invention is not limited to this specific form of control means and an electromagnetic device may be used. Moreover, a linear solenoid may be used, or a plurality of hydraulic cylinders may be used to enable the maximum tilting angle of the swash plate of the pump 14 to be set in more than three stages or continuously, to thereby control the rise and fall of the number of revolutions of the engine 12. When this is the case, the engine and the hydraulic device can be set in a manner to be optimized for various loads of the engine, thereby allowing a further reduction in fuel consumption to be achieved. The invention can have application in a control system which uses an electric motor for driving the hydraulic pump 14 in place of the engine 12. Moreover, an electronically controlled governor may be used for increasing or decreasing the quantity of injected fuel, to thereby increase or decrease the number of revolutions of the engine. In this case, the need to use the hydraulic cylinder 52a and the second intermediate lever 51d can be eliminated. The invention has been described as being incorporated in a hydraulic excavator of the wheel type, but the invention is not limited to the embodiments shown and described hereinabove. The invention can also have application in other hydraulic construction machinery which shows great variations in load.

In the embodiments shown and described hereinabove, the predetermined values by which the number of revolutions of the engine 12 is altered by the engine revolution number altering means 52 has been described as a constant values substantially equal to the difference between the first maximum value $N_E$ and second maximum value $N_P$. However, the predetermined values may be changed to be smaller as the number of revolutions of the engine 12 is reduced, so as to thereby eliminate a variation in the quantity of pressurized fluid delivered by the pump 14 with increased effectiveness even when a variation in the number of revolutions occures in a range of the number of revolutions smaller than the first maximum value $N_E$.

What is claimed is:

1. A control system of hydraulic construction machinery comprising a prime mover, revolution number control means for controlling number of revolutions of the prime mover, at least one variable-displacement hydraulic pump driven by the prime mover, displacement volume control means for controlling displacement volume of the hydraulic pump, at least one actuator driven by pressurized fluid delivered by the hydraulic pump, maximum revolution number altering means associated with the revolution number control means for altering the maximum number of revolutions of the prime mover between at least a first maximum value and a second maximum value greater than the first maximum value, maximum displacement volume altering means associated with the displacement volume control means for altering the maximum displacement volume of the hydraulic pump between at least a first maximum value and a second maximum value geater than the first maximum value and information provider means for providing information on the operation mode of the actuator, so that the maximum revolution number altering means and maximum displacement volume altering means are controlled by an output signal of the information provider means to provide a maximum number of revolutions and a maximum displacement volume which suit the operation mode indicated by the output signal, characterized in that the system further comprises control means for controlling said maximum revolutions number altering means and said maximum displacement volume altering means such that a product of the maximum displacement volume and number of revolutions becomes at a constant always at the same time when the maximum displacement volume of said hydraulic pump is varied in response to an output signal of said information provider means, whereby a change in the quantity of pressurized fluid delivered by said hydraulic pump can be essentially avoided when the maximum displacement volume of the hydraulic pump is altered.

2. A control system of hydraulic construction machinery as claimed in claim 1, wherein said information provider means comprises revolution number sensor means for sensing the number of revolutions of the prime mover, wherein said maximum revolution number altering means is constructed to alter the number of revolutions of the prime mover when the number of revolutions of the prime mover controlled by the revolution number control means exceeds the first maximum value and wherein said control means controls the maximum revolution number altering means and maximum displacement voluem altering means in response to the output signal of the revolution number sensor means in such a manner than, when the number of revolutions of the prime mover has a value equal to or smaller than the first maximum value, the maximum displacement volume of the hydraulic pump has the second maximum value, and that, when the number of revolutions of the prime mover exceeds the first maximum value. the maximum displacement volume of the hydraulic pump is reduced and at the same time the maximum number of revolutions of the prime mover is increased.

3. A control system of hydraulic construction machinery as claimed in claim 2, wherein said control means is constructed to alter the displacement volume of the hydraulic pump discontinuously to the first maximum value by the maximum displacement volume altering means when the number of revolutions of the prime mover exceeds the first maximum value and at the same time to alter the maximum number of revolutions of the prime mover to the second maximum number by the maximum revolution number altering means.

4. A control system of hydraulic construction machinery as claimed in claim 2, wherein said control means is constructed to alter the maximum displacement volume of the hydraulic pump continuously to the first maximum value when the number of revolutions of the prime mover exceeds the first maximum value and at the same time to alter the maximum number of the revolution of the prime mover continuously until the second maximum value by the maximum revolution number altering means.

5. A control system of hydraulic construction machinery as claimed in claim 2, wherein said information provider means further comprises operation mode selection means for selecting the operation mode of the actuator from a power mode and an economy mode, and wherein said control means responds to an output signal of said operation mode selection means and is operative to control the maximum displacement volume altering means and maximum revolution number altering means in such a manner that alteration of the maximum displacement volume and the maximum number of revolutions is effected only when the number of revolutions of the prime mover exceeds the first maximum value and the output signal of the operation mode selection means indicates the power mode.

6. A control system of hydraulic construction machinery as claimed in claim 4 in which said revolution number control means comprises an engine control lever in a cab, wherein said maximum revolution number altering means comprises the revolution number control means, and wherein said control means responds, when the number of revolutions of the prime mover exceeds the first maximum value, to the output signal of the information provider means while the maximum number of revolutions is altered by further manipulating the engine control lever of the revolution number control means whereby the maximum displacement volume and the maximum number of revolutions can be altered continuously.

7. A control system of hydraulic construction machinery as claimed in claim 6, wherein said information provider means comprises a throttle for producing pressure differential which increases as the number of revolutions of the prime mover increases.

8. A control system of hydraulic construction machinery as claimed in claim 4, wherein said information provider means comprises load sensor means for sensing a load of said actuator and outputs a load signal commensurate with the load, and wherein said control means responds, when the number of revolutions of the prime mover exceeds the first maximum value, to the output signal of the load sensor means and controls the maximum revolution number altering means and the maximum displacement volume altering means whereby the maximum displacement volume and the maximum number of revolutions can be continuously altered.

9. A control system of hydraulic construction machinery as claimed in claim 4, wherein said information provider means further comprises load sensor means for sensing a load of the actuator and producing a load signal commensurate with the load and a throttle for producing pressure differential which increases as the number of revolutions of the prime mover increases, and wherein said control means responds, when the number of revolutions of the prime mover exceeds the first maximum value, to the pressure differential of the throttle and controls the maximum displacement volume altering means while controlling the maximum revolution number altering means in response to the output signal of the load sensor means, whereby the maximum displacement volume and the maximum number of revolutions can be continuously altered.

10. A control system of hydraulic construction machinery as claimed in claim 9, wherein said load sensor means comprises pressure sensor means for sensing a pressure of fluid in a hydraulic circuit for driving the actuator.

11. A control system of hydraulic construction machinery as claimed in claim 1, wherein said maximum revolution number altering means comprises revolution number altering means for altering by a predetermined amount the number of revolutions of the prime mover, regardless of the value of the number of revolutions, controlled by the revolution number control means to provide a large number of revolutions and a small number of revolutions, and wherein said control means controls the revolution number altering means and the maximum displacement volume altering means in response to operation mode information provided by the information provider means in such a manner that, when the information indicates a low-load operation, the hydraulic pump and prime mover are controlled by a first combination in which the maximum displacement volume of the hydraulic pump has the second maximum value and the number of revolutions of the prime mover is said small number of revolutions, and, when the information indicates a high-load operation, the hydraulic pump and prime mover are controlled by a second combination in which the maximum displacement volume of the hydraulic pump has the first maximum value and the number of revolutions of the prime mover is said large number of revolutions.

12. A control system of hydraulic construction machinery as claimed in claim 11, wherein said revolution number altering means alters the number of revolutions of the prime mover by a value equal to a difference between the first maximum value and the second maximum value of the number of the revolutions of the prime mover as said predetermined amount.

13. A control system of hydraulic construction machinery as claimed in claim 11, wherein said information provider comprises operation mode selection means for selecting the operation mode of the actuator from a power mode and an economy mode, and wherein said control means responds to an output signal of the operation mode selection means and determines that the load is low when the output signal indicates the economy mode and that the load is high when the output signal indicates the power mode and controls with suitable combinations, accordingly.

14. A control system of hydraulic construction machinery as claimed in claim 11, wherein said information provider means comprises load sensor means for sensing a load of the actuator and outputting a load signal commensurate with the load, and wherein said control means responds to an output signal of the load sensor means and determines that a low-load operation is indicated when the sensed load is lower in value than a predetermined level and that a high-load operation is indicated when the sensed load is higher in value than the predetermined level and controls with suitable combinations, accordingly.

15. A control system of hydraulic construction machinery as claimed in claim 11, wherein said information provider means comprises load sensor means for sensing a load of the actuator and outputting a load signal commensurate with the load, operation mode selection means for selecting the operation mode of the actuator from a power mode and an economy mode and automatic control selection means for indicating whether or not to select automatic control and wherein said control means responds to output signals of the load sensor means, operation mode selection means and automatic control selection means and determines, when automatic control is selected, whether the operation is a low-load operation or a high-load operation based on the output signal of the load sensor means and determines, when no automatic control is selected, whether the operation is a low-load operation or a high-load operation based on the output signal of the operation mode selection means and controls with suitable combinations, accordingly.

16. A control system of hydraulic construction machinery as claimed in claim 14 or 15, wherein said load sensor means comprises pressure sensor means for sensing a pressure of fluid in a hydraulic circuit for driving the actuator.

17. A control system of hydraulic construction machinery as claimed in claim 14 or 15, wherein said control means is operative, when control is effected based on the output signal of the load sensor means, to hold a new combination, when the first combination and the second combination are altered, until a predetermined period of time elapses following the alteration.

* * * * *